US012726712B2

(12) United States Patent
Yoshimuta et al.

(10) Patent No.: US 12,726,712 B2
(45) Date of Patent: Sep. 1, 2026

(54) IMAGING DEVICE AND IMAGING METHOD

(71) Applicant: Sony Group Corporation, Tokyo (JP)

(72) Inventors: Junki Yoshimuta, Kanagawa (JP); Yutaro Honda, Kanagawa (JP); Masamiki Kawase, Tokyo (JP); Naoto Makino, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 210 days.

(21) Appl. No.: 18/577,561

(22) PCT Filed: Feb. 22, 2022

(86) PCT No.: PCT/JP2022/007141

§ 371 (c)(1),
(2) Date: Jan. 8, 2024

(87) PCT Pub. No.: WO2023/286314

PCT Pub. Date: Jan. 19, 2023

(65) Prior Publication Data

US 2024/0340540 A1 Oct. 10, 2024

(30) Foreign Application Priority Data

Jul. 16, 2021 (JP) ................................ 2021-117935

(51) Int. Cl.
*H04N 23/72* (2023.01)
*H04N 5/76* (2006.01)
(Continued)

(52) U.S. Cl.
CPC .............. *H04N 23/72* (2023.01); *H04N 5/76* (2013.01); *H04N 23/611* (2023.01); (Continued)

(58) Field of Classification Search
CPC ........ H04N 23/72; H04N 5/76; H04N 23/611; H04N 23/62; H04N 23/634; H04N 23/635;
(Continued)

(56) References Cited

U.S. PATENT DOCUMENTS

2016/0150180 A1* 5/2016 Kozuka .................. H04N 5/913 386/254
2017/0126987 A1* 5/2017 Tan ...................... H04N 23/743
(Continued)

FOREIGN PATENT DOCUMENTS

JP 2010-268134 A 11/2010
JP 2013-251724 A 12/2013
(Continued)

*Primary Examiner* — Abdelaaziz Tissire
(74) *Attorney, Agent, or Firm* — Paratus Law Group, PLLC

(57) ABSTRACT

There is provided an imaging device and an imaging method that can perform imaging while appropriately adjusting each of exposure of SDR video and exposure of HDR video. The imaging device includes: an SDR signal processing unit configured to generate SDR video on the basis of a video signal output from an imaging element; an HDR signal processing unit configured to generate HDR video on the basis of the video signal; an SDR/HDR exposure adjusting unit configured to adjust each of exposure of the SDR video and exposure of the HDR video; an SDR exposure adjusting unit configured to adjust only the exposure of the SDR video; an SDR recording unit on which the SDR video is recorded; an HDR recording unit on which the HDR video is recorded; and a display unit configured to display SDR exposure information about the SDR video and HDR exposure information about the HDR video together with the SDR video and the HDR video. The present technology can be applied to, for example, a camera capable of simultaneously producing SDR video and HDR video.

20 Claims, 30 Drawing Sheets

(51) Int. Cl.

| | |
|---|---|
| ***H04N 23/611*** | (2023.01) |
| ***H04N 23/62*** | (2023.01) |
| ***H04N 23/63*** | (2023.01) |
| ***H04N 23/71*** | (2023.01) |
| ***H04N 23/741*** | (2023.01) |

(52) U.S. Cl.
CPC ........... *H04N 23/62* (2023.01); *H04N 23/634* (2023.01); *H04N 23/635* (2023.01); *H04N 23/71* (2023.01); *H04N 23/741* (2023.01)

(58) Field of Classification Search
CPC ...... H04N 23/71; H04N 23/741; H04N 23/55; H04N 23/73; H04N 23/75; H04N 23/76; G03B 7/091; G03B 15/00; G03B 17/18
See application file for complete search history.

(56) References Cited

U.S. PATENT DOCUMENTS

2018/0332210 A1* 11/2018 Kamiya ............. H04N 21/4402
2019/0246087 A1* 8/2019 Uesaka ................ H04N 9/8715
2019/0253687 A1* 8/2019 Fukushima .............. H04N 9/87
2019/0327423 A1* 10/2019 Sudo .................... H04N 23/741
2020/0344400 A1* 10/2020 Matsuoka .............. H04N 23/84
2021/0099633 A1* 4/2021 Nakayama ........... H04N 23/741
2022/0053118 A1* 2/2022 Nashizawa .......... H04N 23/741

FOREIGN PATENT DOCUMENTS

| | | | |
|---|---|---|---|
| JP | 2014-167609 | A | 9/2014 |
| JP | 2019004230 | A | 1/2019 |
| JP | 2019-057794 | A | 4/2019 |
| JP | 2019074639 | A | 5/2019 |
| JP | 2019-110430 | A | 7/2019 |
| JP | 2019-180104 | A | 10/2019 |
| JP | 2019-193084 | A | 10/2019 |
| JP | 2020-141378 | A | 9/2020 |
| JP | 2020-182179 | A | 11/2020 |
| JP | 2020-182186 | A | 11/2020 |
| JP | 2020205528 | A | 12/2020 |
| JP | 2021-090109 | A | 6/2021 |
| WO | WO-2020175298 | A1 | 9/2020 |

* cited by examiner

USER OPERATION UNIT
10
EXPOSURE ADJUSTING UNIT
11
DISPLAY UNIT
8
EXPOSURE DETECTION UNIT
9
SDRGain ADJUSTING UNIT
12
SDR SIGNAL PROCESSING UNIT
4
HDR RECORDING UNIT
7
HDR SIGNAL PROCESSING UNIT
6
SDR RECORDING UNIT
5
Gain ADJUSTING UNIT
16
Shutter ADJUSTING UNIT
15
ND ADJUSTING UNIT
14
DIAPHRAGM ADJUSTING UNIT
13
3
2
1

3
31
EXPOSURE DETECTION UNIT
41
SDR EXPOSURE DETECTION UNIT
42
HDR EXPOSURE DETECTION UNIT
32
SDR EXPOSURE-INFORMATION CALCULATION UNIT
33
HDR EXPOSURE-INFORMATION CALCULATION UNIT
11
EXPOSURE ADJUSTING UNIT

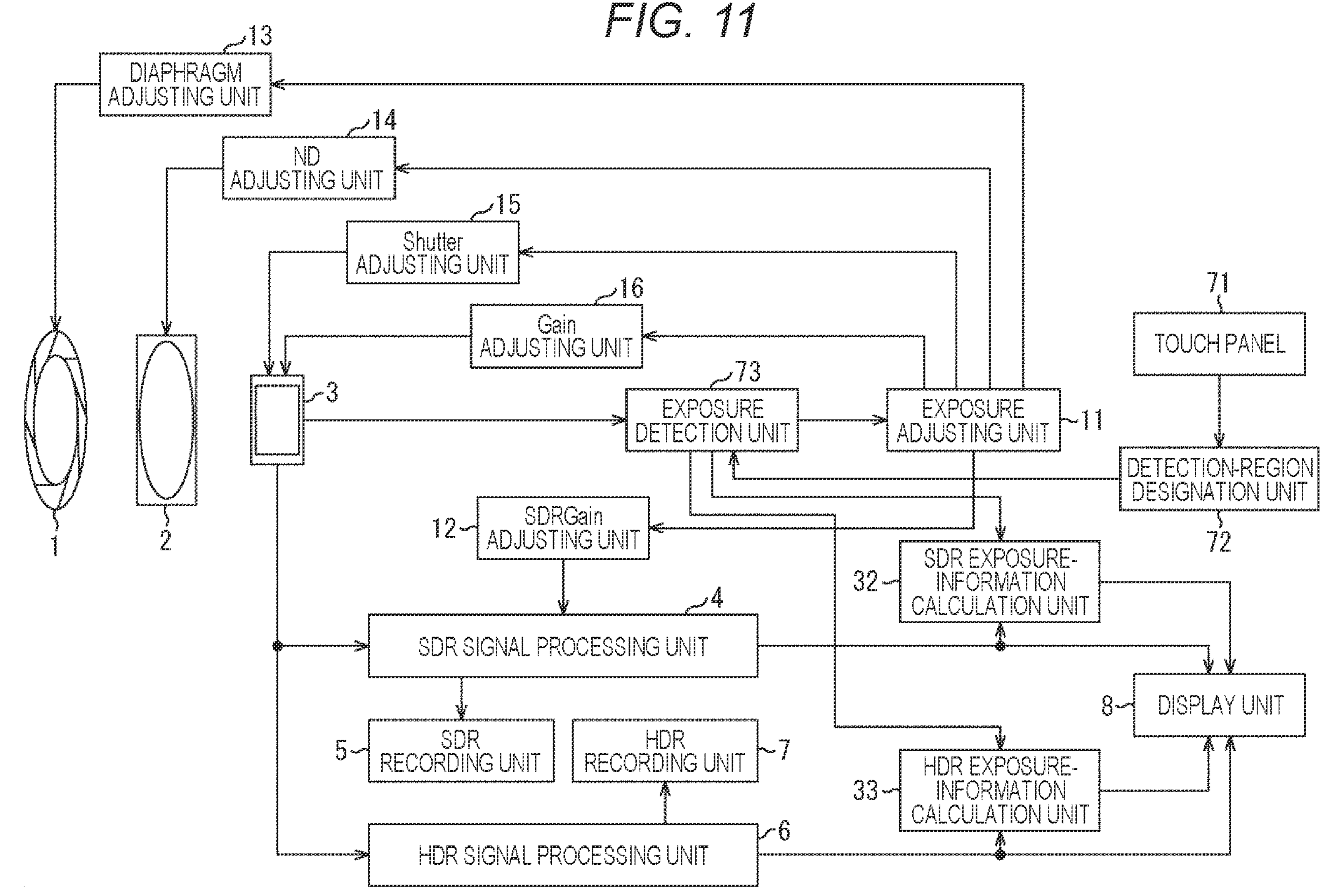
FIG. 11
DIAPHRAGM ADJUSTING UNIT
13
ND ADJUSTING UNIT
14
Shutter ADJUSTING UNIT
15
Gain ADJUSTING UNIT
16
TOUCH PANEL
71
3
EXPOSURE DETECTION UNIT
73
EXPOSURE ADJUSTING UNIT
11
DETECTION-REGION DESIGNATION UNIT
72
1
2
SDRGain ADJUSTING UNIT
12
SDR EXPOSURE-INFORMATION CALCULATION UNIT
32
SDR SIGNAL PROCESSING UNIT
4
DISPLAY UNIT
8
SDR RECORDING UNIT
5
HDR RECORDING UNIT
7
HDR EXPOSURE-INFORMATION CALCULATION UNIT
33
HDR SIGNAL PROCESSING UNIT
6

Figure 12:
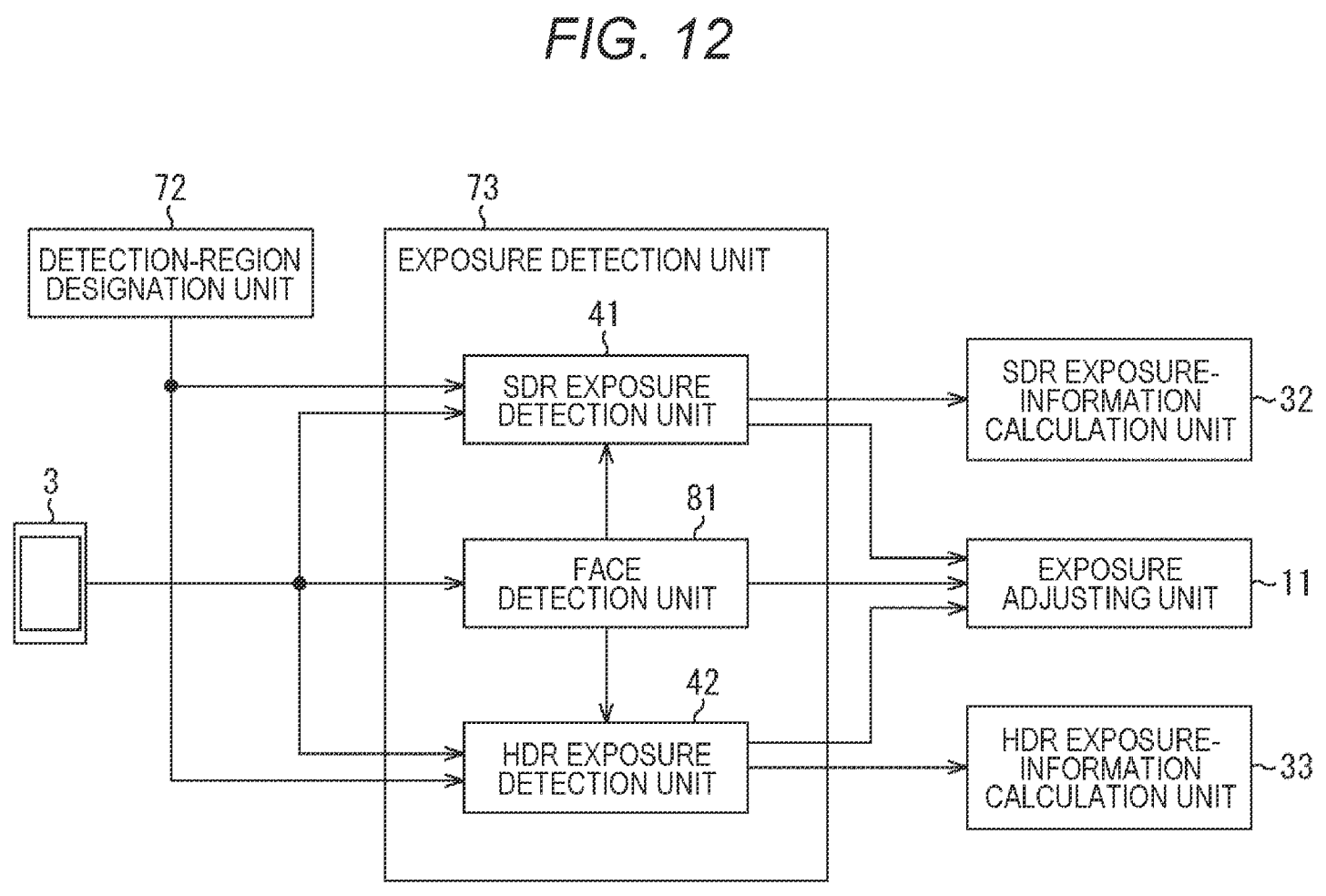

72 DETECTION-REGION DESIGNATION UNIT

73 EXPOSURE DETECTION UNIT

41 SDR EXPOSURE DETECTION UNIT

81 FACE DETECTION UNIT

42 HDR EXPOSURE DETECTION UNIT

32 SDR EXPOSURE-INFORMATION CALCULATION UNIT

11 EXPOSURE ADJUSTING UNIT

33 HDR EXPOSURE-INFORMATION CALCULATION UNIT

F1
SDR [40%]
HDR [30%]
F2
SDR [40%]
HDR [30%]
F3
SDR [60%]
HDR [40%]
F4
SDR [30%]
HDR [20%]
DETECTED FACE
SELECTED FACE

FIG. 16

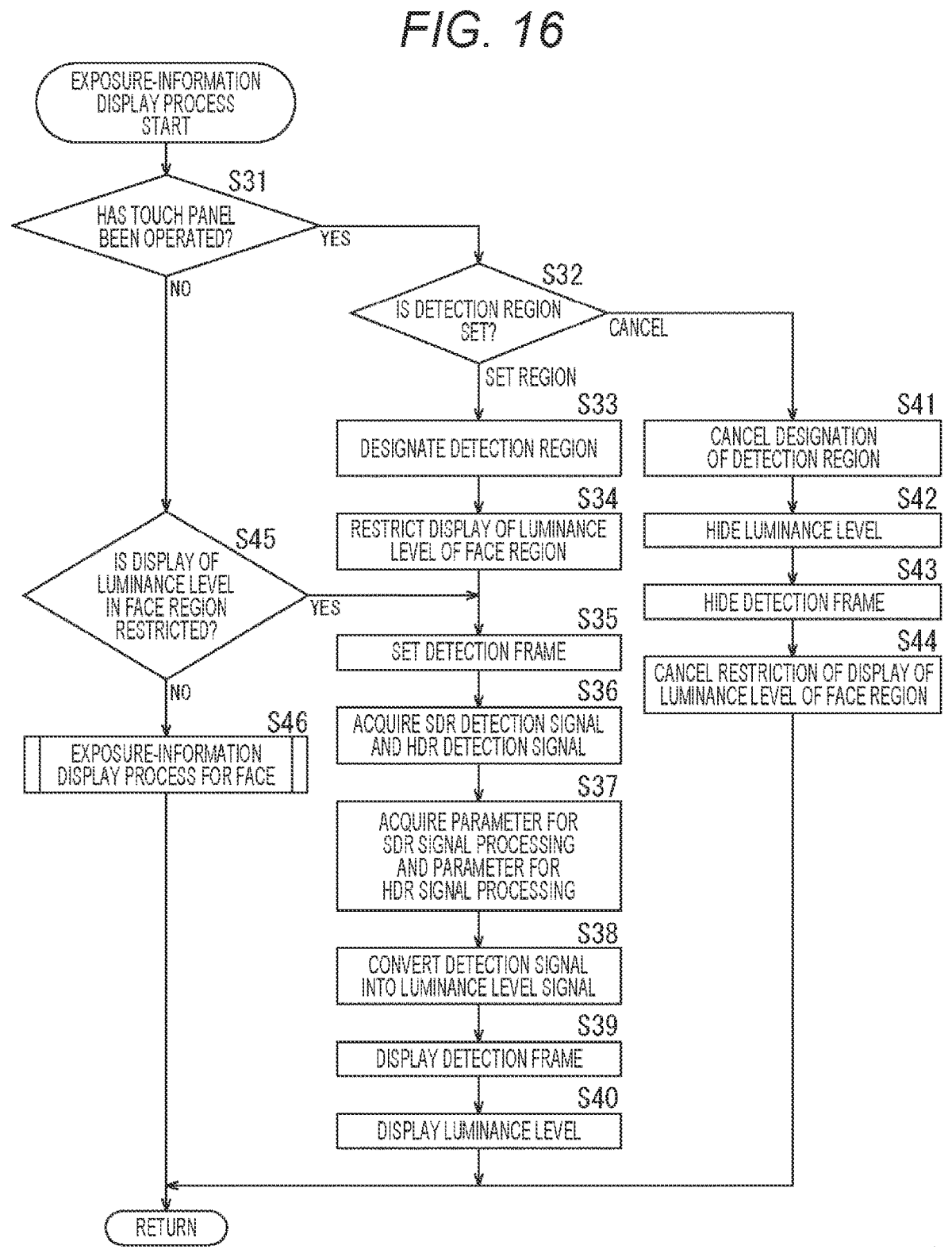

EXPOSURE-INFORMATION DISPLAY PROCESS START

S31 HAS TOUCH PANEL BEEN OPERATED?

YES

NO

S32 IS DETECTION REGION SET?

CANCEL

SET REGION

S33 DESIGNATE DETECTION REGION

S34 RESTRICT DISPLAY OF LUMINANCE LEVEL OF FACE REGION

S45 IS DISPLAY OF LUMINANCE LEVEL IN FACE REGION RESTRICTED?

YES

NO

S35 SET DETECTION FRAME

S36 ACQUIRE SDR DETECTION SIGNAL AND HDR DETECTION SIGNAL

S37 ACQUIRE PARAMETER FOR SDR SIGNAL PROCESSING AND PARAMETER FOR HDR SIGNAL PROCESSING

S38 CONVERT DETECTION SIGNAL INTO LUMINANCE LEVEL SIGNAL

S39 DISPLAY DETECTION FRAME

S40 DISPLAY LUMINANCE LEVEL

S41 CANCEL DESIGNATION OF DETECTION REGION

S42 HIDE LUMINANCE LEVEL

S43 HIDE DETECTION FRAME

S44 CANCEL RESTRICTION OF DISPLAY OF LUMINANCE LEVEL OF FACE REGION

S46 EXPOSURE-INFORMATION DISPLAY PROCESS FOR FACE

RETURN 3
101
EXPOSURE DETECTION UNIT
41
SDR EXPOSURE DETECTION UNIT
42
HDR EXPOSURE DETECTION UNIT
32
SDR EXPOSURE-INFORMATION CALCULATION UNIT
33
HDR EXPOSURE-INFORMATION CALCULATION UNIT
103
SDR EXPOSURE CONTROL UNIT
104
HDR EXPOSURE CONTROL UNIT

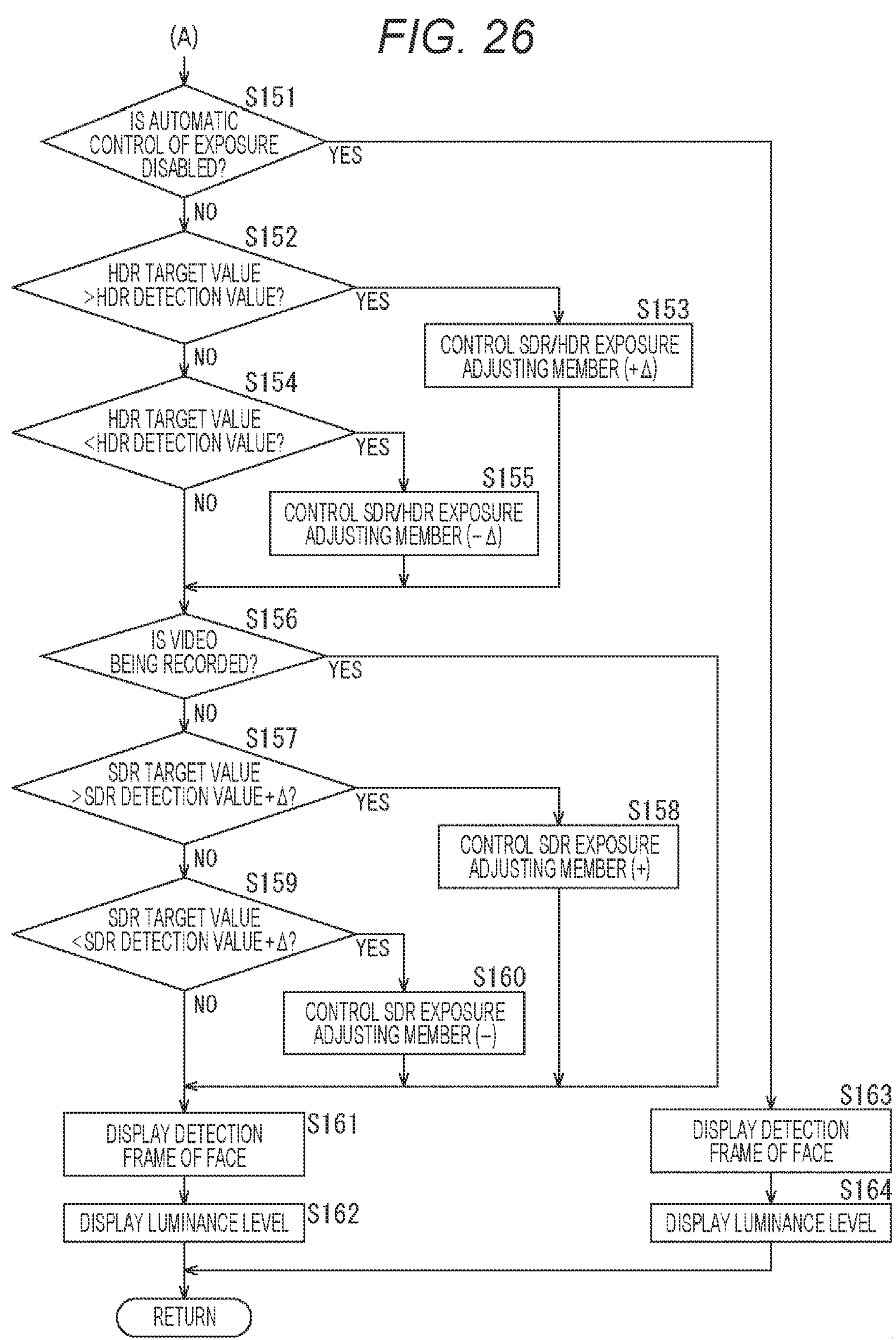
FIG. 26
(A)
S151
IS AUTOMATIC CONTROL OF EXPOSURE DISABLED?
YES
NO
S152
HDR TARGET VALUE >HDR DETECTION VALUE?
YES
S153
CONTROL SDR/HDR EXPOSURE ADJUSTING MEMBER (+Δ)
NO
S154
HDR TARGET VALUE <HDR DETECTION VALUE?
YES
S155
CONTROL SDR/HDR EXPOSURE ADJUSTING MEMBER (−Δ)
NO
S156
IS VIDEO BEING RECORDED?
YES
NO
S157
SDR TARGET VALUE >SDR DETECTION VALUE+Δ?
YES
S158
CONTROL SDR EXPOSURE ADJUSTING MEMBER (+)
NO
S159
SDR TARGET VALUE <SDR DETECTION VALUE+Δ?
YES
S160
CONTROL SDR EXPOSURE ADJUSTING MEMBER (−)
NO
S161
DISPLAY DETECTION FRAME OF FACE
S162
DISPLAY LUMINANCE LEVEL
S163
DISPLAY DETECTION FRAME OF FACE
S164
DISPLAY LUMINANCE LEVEL
RETURN

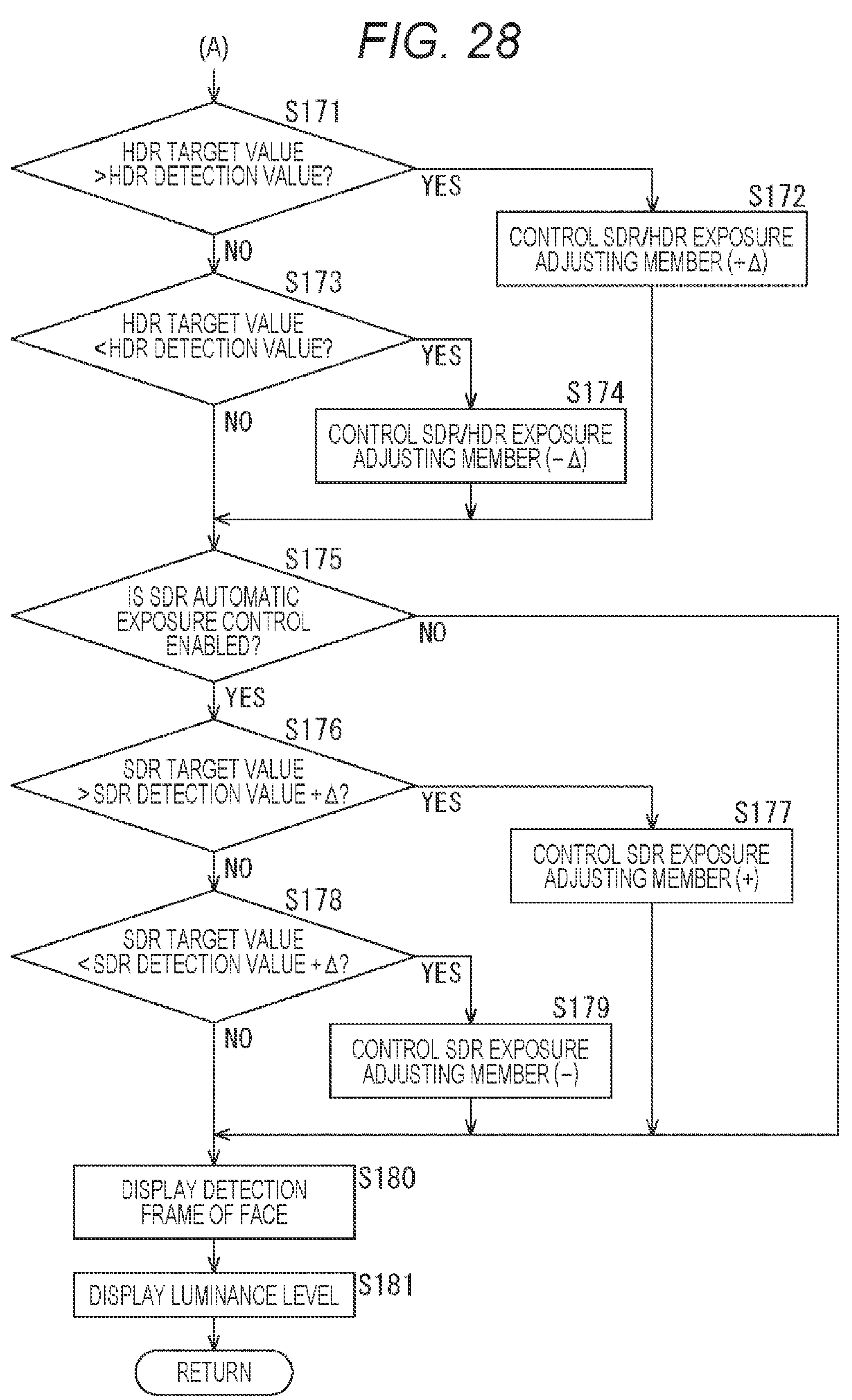
FIG. 28
(A)
S171
HDR TARGET VALUE >HDR DETECTION VALUE?
YES
NO
S172
CONTROL SDR/HDR EXPOSURE ADJUSTING MEMBER (+Δ)
S173
HDR TARGET VALUE <HDR DETECTION VALUE?
YES
NO
S174
CONTROL SDR/HDR EXPOSURE ADJUSTING MEMBER (−Δ)
S175
IS SDR AUTOMATIC EXPOSURE CONTROL ENABLED?
NO
YES
S176
SDR TARGET VALUE >SDR DETECTION VALUE +Δ?
YES
NO
S177
CONTROL SDR EXPOSURE ADJUSTING MEMBER (+)
S178
SDR TARGET VALUE <SDR DETECTION VALUE +Δ?
YES
NO
S179
CONTROL SDR EXPOSURE ADJUSTING MEMBER (−)
S180
DISPLAY DETECTION FRAME OF FACE
S181
DISPLAY LUMINANCE LEVEL
RETURN 13
DIAPHRAGM ADJUSTING UNIT
14
ND ADJUSTING UNIT
15
Shutter ADJUSTING UNIT
16
Gain ADJUSTING UNIT
10
USER OPERATION UNIT
3
9
EXPOSURE DETECTION UNIT
EXPOSURE ADJUSTING UNIT
11
12
SDRGain ADJUSTING UNIT
1
2
4
SDR SIGNAL PROCESSING UNIT
8
DISPLAY UNIT
5
SDR RECORDING UNIT
HDR RECORDING UNIT
7
HDR SIGNAL PROCESSING UNIT
6
132
LOG SIGNAL PROCESSING UNIT
131
LOG RECORDING UNIT

IMAGING DEVICE AND IMAGING METHOD

CROSS REFERENCE TO PRIOR APPLICATION

This application is a National Stage Patent Application of PCT International Patent Application No. PCT/JP2022/007141 (filed on Feb. 22, 2022) under 35 U.S.C. § 371, which claims priority to Japanese Patent Application No. 2021-117935 (filed on Jul. 16, 2021), which are all hereby incorporated by reference in their entirety.

TECHNICAL FIELD

The present technology relates to an imaging device and an imaging method, and more particularly, to an imaging device and an imaging method that can perform imaging while appropriately adjusting each of exposure of SDR video and exposure of HDR video.

BACKGROUND ART

In recent years, in video production, there has been introduced a high dynamic range (HDR) capable of high-light representation that could not be attained with a standard dynamic range (SDR), i.e., a conventional dynamic range. Whereas SDR is still the mainstream in the current broadcasting, a demand for HDR as a future material is increasing, and it is required to simultaneously produce an SDR-video program and an HDR-video program.

HDR video and SDR video can be obtained by a method in which imaging is performed with HDR and thereafter HDR video having been obtained is converted into SDR video on the basis of metadata. This method requires a video engineer or the like to adjust each scene, and is not suitable for live broadcasting.

Therefore, for example, Patent Document 1 proposes a video camera that produces an SDR video signal and an HDR video signal by one-time imaging.

CITATION LIST

Patent Document

Patent Document 1: Japanese Patent Application Laid-Open No. 2019-180104

SUMMARY OF THE INVENTION

Problems to be Solved by the Invention

In the video camera proposed in Patent Document 1, it is difficult to appropriately adjust each of exposure of SDR video and exposure of HDR video.

In view of such circumstances, the present technology has been made, and can perform imaging while appropriately adjusting each of exposure of SDR video and exposure of HDR video.

Solutions to Problems

An imaging device according to a first aspect of the present technology includes: an SDR signal processing unit configured to generate SDR video on a basis of a video signal output from an imaging element; an HDR signal processing unit configured to generate HDR video on a basis of the video signal; an SDR/HDR exposure adjusting unit configured to adjust each of exposure of the SDR video and exposure of the HDR video; an SDR exposure adjusting unit configured to adjust only the exposure of the SDR video; an SDR recording unit on which the SDR video is recorded; an HDR recording unit on which the HDR video is recorded; and a display unit configured to display SDR exposure information about the SDR video and HDR exposure information about the HDR video together with the SDR video or the HDR video.

An imaging method according to the first aspect of the present technology includes: generating SDR video on a basis of a video signal output from an imaging element; generating HDR video on a basis of the video signal; adjusting each of exposure of the SDR video and exposure of the HDR video; adjusting only the exposure of the SDR video; recording the SDR video; recording the HDR video; and displaying SDR exposure information about the SDR video and HDR exposure information about the HDR video together with the SDR video or the HDR video.

An imaging device according to a second aspect of the present technology includes: an SDR signal processing unit configured to generate SDR video on a basis of a video signal output from an imaging element; an HDR signal processing unit configured to generate HDR video on a basis of the video signal; an SDR detection unit configured to acquire an SDR detection signal indicating brightness of an imaging range of the SDR video; an HDR detection unit configured to acquire an HDR detection signal indicating brightness of an imaging range of the HDR video; an SDR exposure control unit configured to control exposure of the SDR video on a basis of the SDR detection signal; an HDR exposure control unit configured to control exposure of the HDR video on a basis of the HDR detection signal; an SDR recording unit on which the SDR video is recorded; and an HDR recording unit on which the HDR video is recorded, in which the SDR detection unit and the SDR exposure control unit operate in accordance with a first algorithm, and the HDR detection unit and the HDR exposure control unit operate in accordance with a second algorithm different from the first algorithm.

An imaging method according to the second aspect of the present technology includes: generating SDR video on a basis of a video signal output from an imaging element; generating HDR video on a basis of the video signal; acquiring an SDR detection signal indicating brightness of an imaging range of the SDR video in accordance with a first algorithm; acquiring an HDR detection signal indicating brightness of an imaging range of the HDR video in accordance with a second algorithm different from the first algorithm; controlling exposure of the SDR video on a basis of the SDR detection signal in accordance with the first algorithm; controlling exposure of the HDR video on a basis of the HDR detection signal in accordance with the second algorithm; recording the SDR video; and recording the HDR video.

According to the first aspect of the present technology, SDR video is generated on the basis of a video signal output from an imaging element, HDR video is generated on the basis of the video signal, each of exposure of the SDR video and exposure of the HDR video is adjusted, only the exposure of the SDR video is adjusted, the SDR video is recorded, the HDR video is recorded, and SDR exposure information about the SDR video and HDR exposure information about the HDR video, together with the SDR video or the HDR video, are displayed.

According to the second aspect of the present technology, SDR video is generated on the basis of a video signal output from an imaging element, HDR video is generated on the basis of the video signal, an SDR detection signal indicating the brightness of an imaging range of the SDR video is acquired in accordance with a first algorithm, an HDR detection signal indicating the brightness of an imaging range of the HDR video is acquired in accordance with a second algorithm different from the first algorithm, exposure of the SDR video is controlled on the basis of the SDR detection signal in accordance with the first algorithm, exposure of the HDR video is controlled on the basis of the HDR detection signal in accordance with the second algorithm, the SDR video is recorded, and the HDR video is recorded.

BRIEF DESCRIPTION OF DRAWINGS

FIG. 11 is a block diagram illustrating an example of a second configuration of the imaging device.

FIG. 12 is a block diagram illustrating an example of a configuration of an exposure detection unit.

FIG. 16 is a flowchart illustrating the exposure-information display process performed in the step S6 in FIG. 9.

FIG. 22 is a view illustrating an example of a plurality of detection frames set by the HDR exposure detection unit.

FIG. 26 is a flowchart illustrating an exposure control process in a case where change of a setting value of an SDR exposure adjusting member is restricted during video recording.

FIG. 28 is a flowchart illustrating an exposure control process in a case where only exposure control by an SDR exposure control unit is enabled or disabled.

MODE FOR CARRYING OUT THE INVENTION

Hereinafter, modes for carrying out the present technology will be described. The description will be given in the following order.

1. Outline of imaging device
2. First Embodiment
3. Second Embodiment
4. Third Embodiment
5. Fourth Embodiment

1. Outline of Imaging Device

Figure 1:
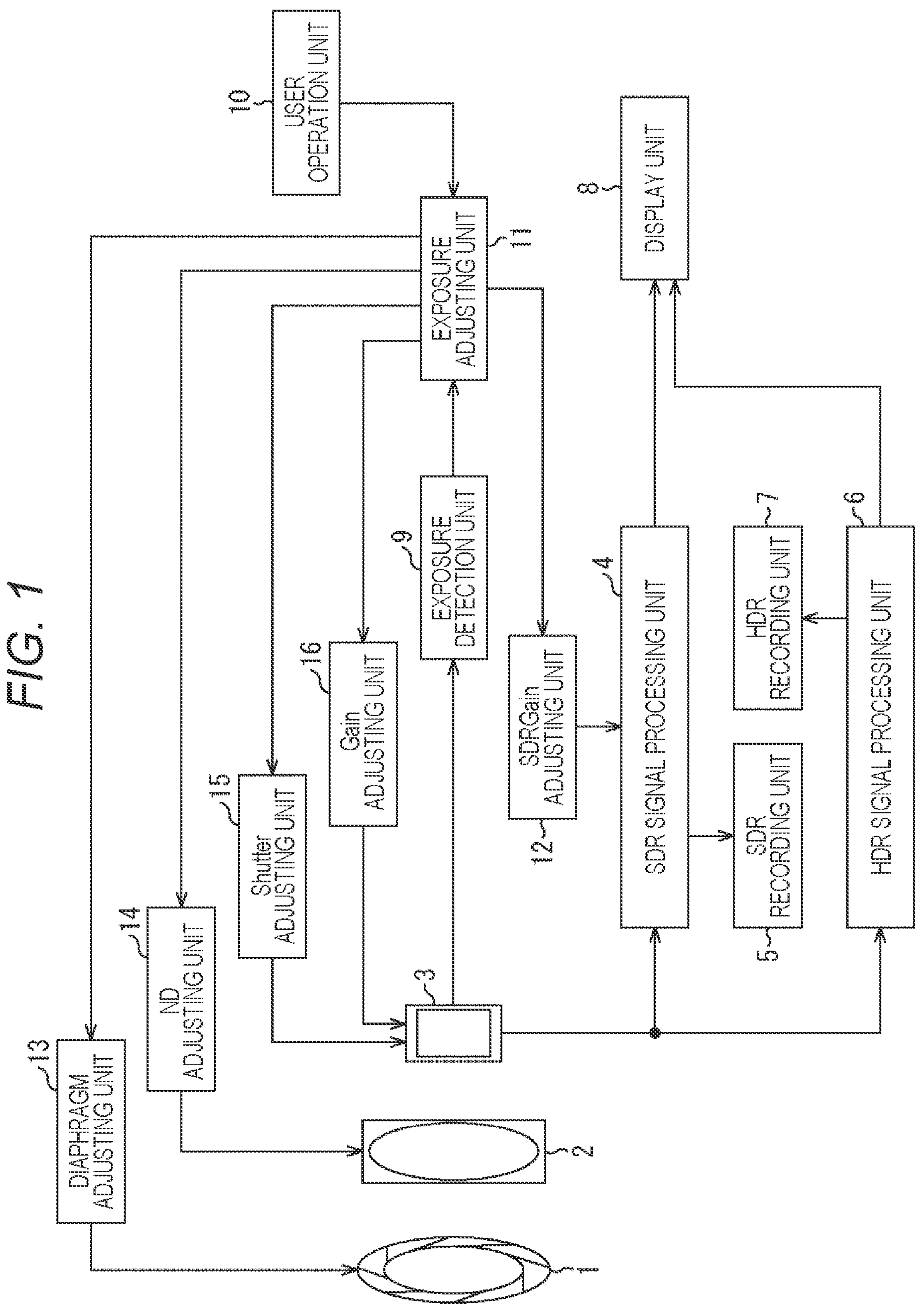
FIG. 1 is a block diagram illustrating an example of a basic configuration of an imaging device according to one embodiment of the present technology.

FIG. 1 is a block diagram illustrating an example of a basic configuration of an imaging device according to one embodiment of the present technology.

As illustrated in FIG. 1, the imaging device includes a diaphragm 1, a variable neutral-density filter 2, an imaging element 3, an SDR signal processing unit 4, an SDR recording unit 5, an HDR signal processing unit 6, an HDR recording unit 7, a display unit 8, an exposure detection unit 9, a user operation unit 10, an exposure adjusting unit 11, an SDR gain adjusting unit 12, a diaphragm adjusting unit 13, an ND adjusting unit 14, a shutter adjusting unit 15, and a gain adjusting unit 16.

The diaphragm 1 adjusts an amount of light incident on the imaging element 3 in accordance with adjustment made by the diaphragm adjusting unit 13.

The variable neutral-density filter 2 includes a neutral-density (ND) filter capable of flexibly changing the transmittance by controlling a voltage to be applied. The variable neutral-density filter 2 adjusts an amount of light incident on the imaging element 3 in accordance with a voltage applied by the ND adjusting unit 14.

Light condensed through an optical system (not illustrated) is imaged on the imaging element 3 through the diaphragm 1 and the variable neutral-density filter 2. The imaging element 3 photoelectrically converts the imaged light. A video signal generated by the photoelectric conversion has signal resolution capable of expressing HDR. After being subjected to predetermined signal processing, the video signal is supplied to the SDR signal processing unit 4, the HDR signal processing unit 6, and the exposure detection unit 9.

The SDR signal processing unit 4 performs, as SDR signal processing, processing such as gamma processing, knee processing, detail processing, color matrix processing, and LUT processing, on the video signal supplied from the imaging element 3, to generate SDR video. The generated SDR video is supplied to the SDR recording unit 5 and the display unit 8.

The SDR recording unit 5 includes, for example, a portable medium such as a large-capacity random access memory (RAM), a solid state drive (SSD), a hard disk drive (HDD), or an SD card provided in the imaging device. On the SDR recording unit 5, the SDR video supplied from the SDR signal processing unit 4 is recorded.

The HDR signal processing unit 6 performs HDR signal processing, such as gamma processing, knee processing, detail processing, color matrix processing, and LUT processing, on the video signal supplied from the imaging element 3, to generate HDR video. The generated HDR video is supplied to the HDR recording unit 7 and the display unit 8. Note that the processing performed in the SDR signal processing and the processing performed in the HDR signal processing are not necessarily the same processing.

The HDR recording unit 7 includes, for example, a portable medium such as a large-capacity RAM, an SSD, an HDD, or an SD card provided in the imaging device. On the HDR recording unit 7, the HDR video supplied from the HDR signal processing unit 6 is recorded. Note that the SDR recording unit 5 and the HDR recording unit 7 may be formed of one recording medium.

The display unit 8 includes a liquid crystal display (LCD) panel, a viewfinder, and the like provided in the imaging device. The display unit 8 displays SDR video supplied from the SDR signal processing unit 4 or HDR video supplied from the HDR signal processing unit 6.

The exposure detection unit 9 detects the brightness within an imaging range of a video signal. Specifically, the exposure detection unit 9 detects an amount of light condensed by the imaging element 3. For example, the exposure detection unit 9 detects an amount of light only in a predetermined frequency band, detects an amount of light only in a randomly-selected region in the imaging range, or detects amounts of a plurality of types of light using different settings or arithmetic expressions within the imaging range. The exposure detection unit 9 supplies a detection signal indicating a result of detection of the brightness in the imaging range, to the exposure adjusting unit 11.

The user operation unit 10 includes operation means such as a switch, a dial, and a menu operation unit. Note that the user operation unit 10 may be realized by a plurality of operation means.

The user operation unit 10 receives an input of an operation by a cameraman (user) who uses the imaging device. The cameraman adjusts exposure, framing, focus, and the like by operating the user operation unit 10 while viewing video displayed on the display unit 8. In a case where SDR video is displayed on the display unit 8, the cameraman produces SDR video and HDR video while viewing the SDR video.

The exposure adjusting unit 11 controls exposure adjusting members that are members for adjusting exposure of at least one of SDR video or HDR video, in accordance with an operation, input of which has been received by the user operation unit 10. The exposure adjusting members include the diaphragm 1, the variable neutral-density filter 2, a shutter (not illustrated), a gain setting member of the imaging element 3, and an SDR gain setting member.

Specifically, the exposure adjusting unit 11 supplies a setting value indicating the degree of adjustment of the exposure adjusting member corresponding to each adjusting unit, to the SDR gain adjusting unit 12, the diaphragm adjusting unit 13, the ND adjusting unit 14, the shutter adjusting unit 15, and the gain adjusting unit 16. Note that the setting value of each exposure adjusting member may be directly supplied to the SDR gain adjusting unit 12, the diaphragm adjusting unit 13, the ND adjusting unit 14, the shutter adjusting unit 15, and the gain adjusting unit 16 by the user operation unit 10.

In this manner, in manually adjusting exposure, the cameraman can adjust the exposure adjusting member by operating the user operation unit 10. Exposure of SDR video and exposure of HDR video are simultaneously adjusted by gains of the diaphragm 1, the variable neutral-density filter 2, the shutter, and the imaging element 3, and hence those exposure adjusting members are also referred to as an SDR/HDR exposure adjusting member. Meanwhile, only exposure of SDR video is adjusted by an SDR gain, and hence the SDR gain setting member is also referred to as an SDR exposure adjusting member. In manually adjusting exposure, the cameraman adjusts exposure of HDR video using the SDR/HDR exposure adjusting member, and then adjusts exposure of SDR video using the SDR exposure adjusting member.

Furthermore, in a case where an SDR gain is empirically determined from the brightness of a subject, the cameraman first determines the SDR gain. The cameraman thereafter finely adjusts the SDR/HDR exposure adjusting member while checking the SDR video displayed on the display unit 8, to adjust the exposure of the SDR video to correct exposure, so that also exposure of HDR video can be appropriately adjusted.

Furthermore, the cameraman can perform an abstract operation to increase an exposure amount regardless of a setting value of each exposure adjusting member. In this case, the exposure adjusting unit 11 observes a deviation of a detection signal supplied from the exposure detection unit 9 using a correct exposure amount set in advance or a correct exposure amount specified by the cameraman via the user operation unit 10, as a true value. The exposure adjusting unit 11 determines which exposure adjusting member should be adjusted in order to realize an exposure amount intended by the cameraman, and controls the exposure adjusting member so that the deviation asymptotically approaches 0.

The SDR gain adjusting unit 12 adjusts the SDR gain setting member in accordance with the setting value supplied from the exposure adjusting unit 11. The SDR gain setting member is provided inside the SDR signal processing unit 4 as a member for setting an SDR gain that is an amplification factor (gain) of a video signal in signal processing performed by the SDR signal processing unit 4.

The diaphragm adjusting unit 13 adjusts the diaphragm 1 in accordance with the setting value supplied from the exposure adjusting unit 11, to adjust an amount of light incident on the imaging element 3.

The ND adjusting unit 14 adjusts a voltage to be applied to the variable neutral-density filter 2 in accordance with the set ting value supplied from the exposure adjusting unit 11.

The shutter adjusting unit 15 adjusts an exposure time of the imaging element 3 in accordance with the setting value supplied from the exposure adjusting unit 11. The shutter has a function of setting an exposure time of the imaging element 3.

The gain adjusting unit 16 adjusts a gain setting member for setting an amplification factor (gain) for generation of a video signal in the imaging element 3, in accordance with the setting value supplied from the exposure adjusting unit 11.

2. First Embodiment

Configuration of Imaging Device

Figure 2:
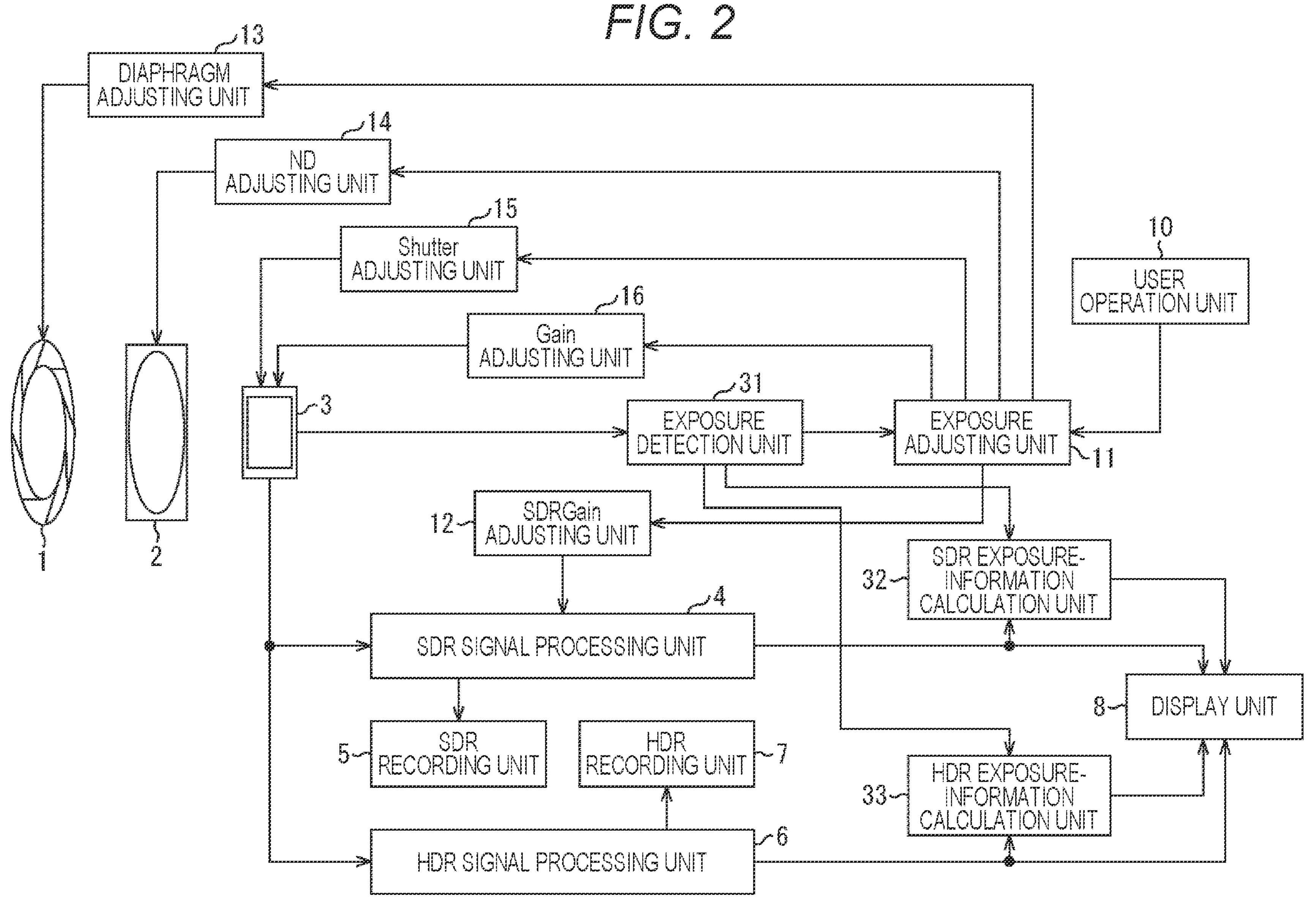
FIG. 2 is a block diagram illustrating an example of a first configuration of the imaging device.

FIG. 2 is a block diagram illustrating an example of a first configuration of the imaging device. In FIG. 2, the same components as the components in FIG. 1 are denoted by the same reference signs. Redundant description will be omitted as appropriate.

The configuration of the imaging device illustrated in FIG. 2 is different from the configuration of the imaging device in FIG. 1 in that an exposure detection unit 31 is provided instead of the exposure detection unit 9. Furthermore, the configuration of the imaging device illustrated in FIG. 2 is different from the configuration of the imaging device in FIG. 1 in that an SDR exposure-information calculation unit 32 and an HDR exposure-information calculation unit 33 are provided in a stage preceding the display unit 8.

In the imaging device according to the first embodiment illustrated in FIG. 2, SDR exposure information that is information indicating exposure of SDR video and HDR exposure information that is information indicating exposure of HDR video are displayed on the display unit 8.

The exposure detection unit 31 is supplied with the same video signal as a video signal supplied to the SDR signal processing unit 4 and the HDR signal processing unit 6, from the imaging element 3. The exposure detection unit 31 detects the brightness within the imaging range of SDR video and the brightness within the imaging range of HDR video.

Figure 3:
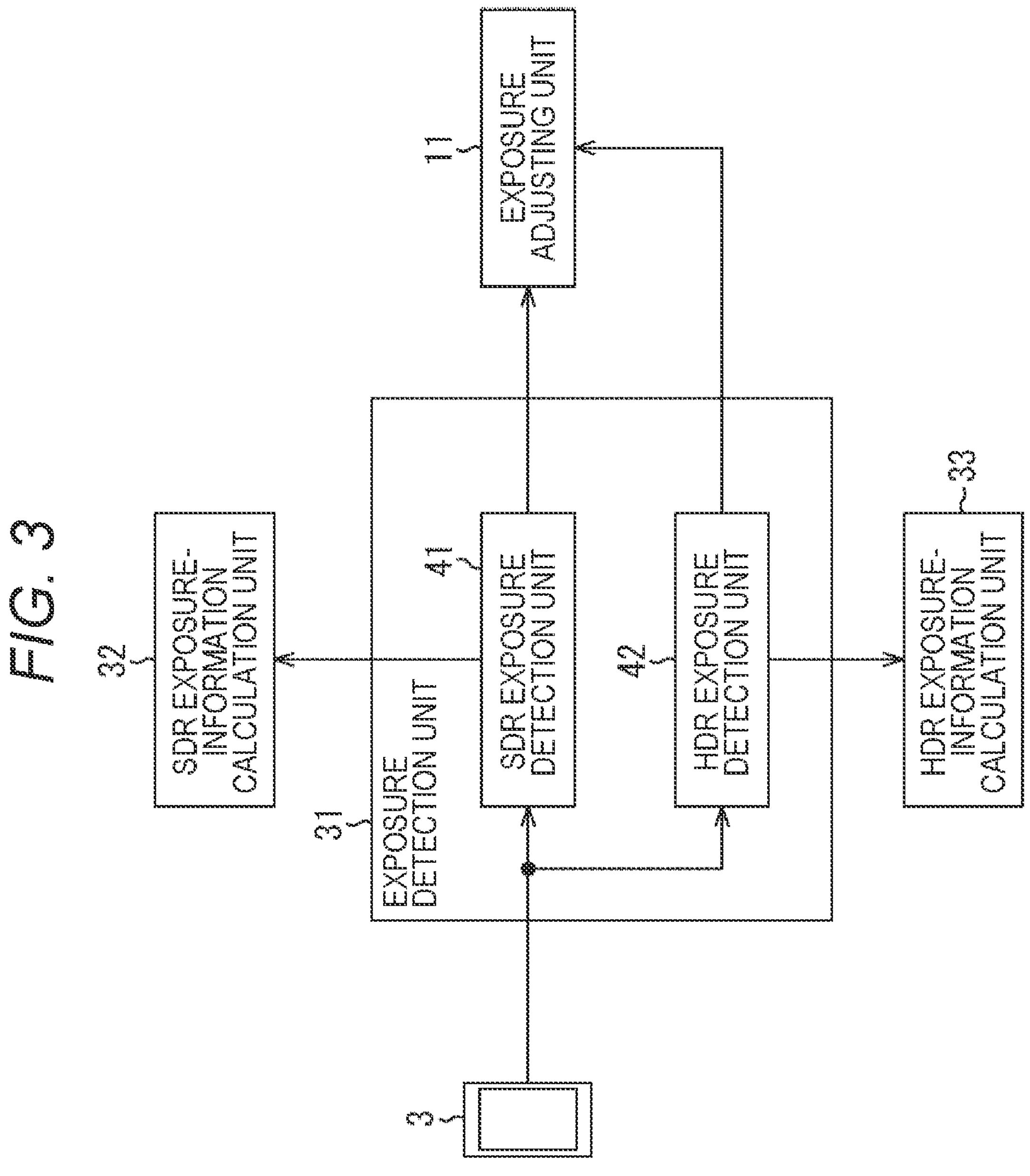
FIG. 3 is a block diagram illustrating an example of a configuration of an exposure detection unit.

FIG. 3 is a block diagram illustrating an example of a configuration of the exposure detection unit 31.

As illustrated in FIG. 3, the exposure detection unit 31 includes an SDR exposure detection unit 41 and an HDR exposure detection unit 42.

The SDR exposure detection unit 41 detects the brightness within the imaging range of SDR video. For example, the SDR exposure detection unit 41 detects the brightness of a region suitable for exposure adjustment of SDR video in the imaging range of a video signal. The SDR exposure detection unit 41 supplies an SDR detection signal indicating the brightness of the imaging range of SDR video, together with the coordinates of a detection region, to the exposure adjusting unit 11 and the SDR exposure-information calculation unit 32. The detection region is a region where detection has been performed.

The HDR exposure detection unit 42 detects the brightness within the imaging range of HDR video. For example, the HDR exposure detection unit 42 detects the brightness of a region suitable for exposure adjustment of HDR video in the imaging range of a video signal. The HDR exposure detection unit 42 supplies an HDR detection signal indicating the brightness of the imaging range of HDR video, together with the coordinates of a detection region, to the exposure adjusting unit 11 and the HDR exposure-information calculation unit 33.

Referring back to FIG. 2, the exposure adjusting unit 11 controls the exposure adjusting member on the basis of the SDR detection signal and the HDR detection signal supplied from the exposure detection unit 31 and the coordinates of the detection region of each detection signal.

The SDR exposure-information calculation unit 32 generates SDR exposure information on the basis of the SDR detection signal supplied from the exposure detection unit 31 and the coordinates of the detection region, and supplies the SDR exposure information to the display unit 8.

The HDR exposure-information calculation unit 33 generates HDR exposure information on the basis of the HDR detection signal supplied from the exposure detection unit 31 and the coordinates of the detection region, and supplies the HDR exposure information to the display unit 8.

The display unit 8 displays the SDR exposure information supplied from the SDR exposure-information calculation unit 32 and the HDR exposure information supplied from the HDR exposure-information calculation unit 33 while superimposing the information on SDR video or HDR video. In the following description, it is supposed that SDR video is displayed on the display unit 8.

Example of Display of SDR Exposure Information and HDR Exposure Information

Example of Display of Highlight Warning

Figure 4:
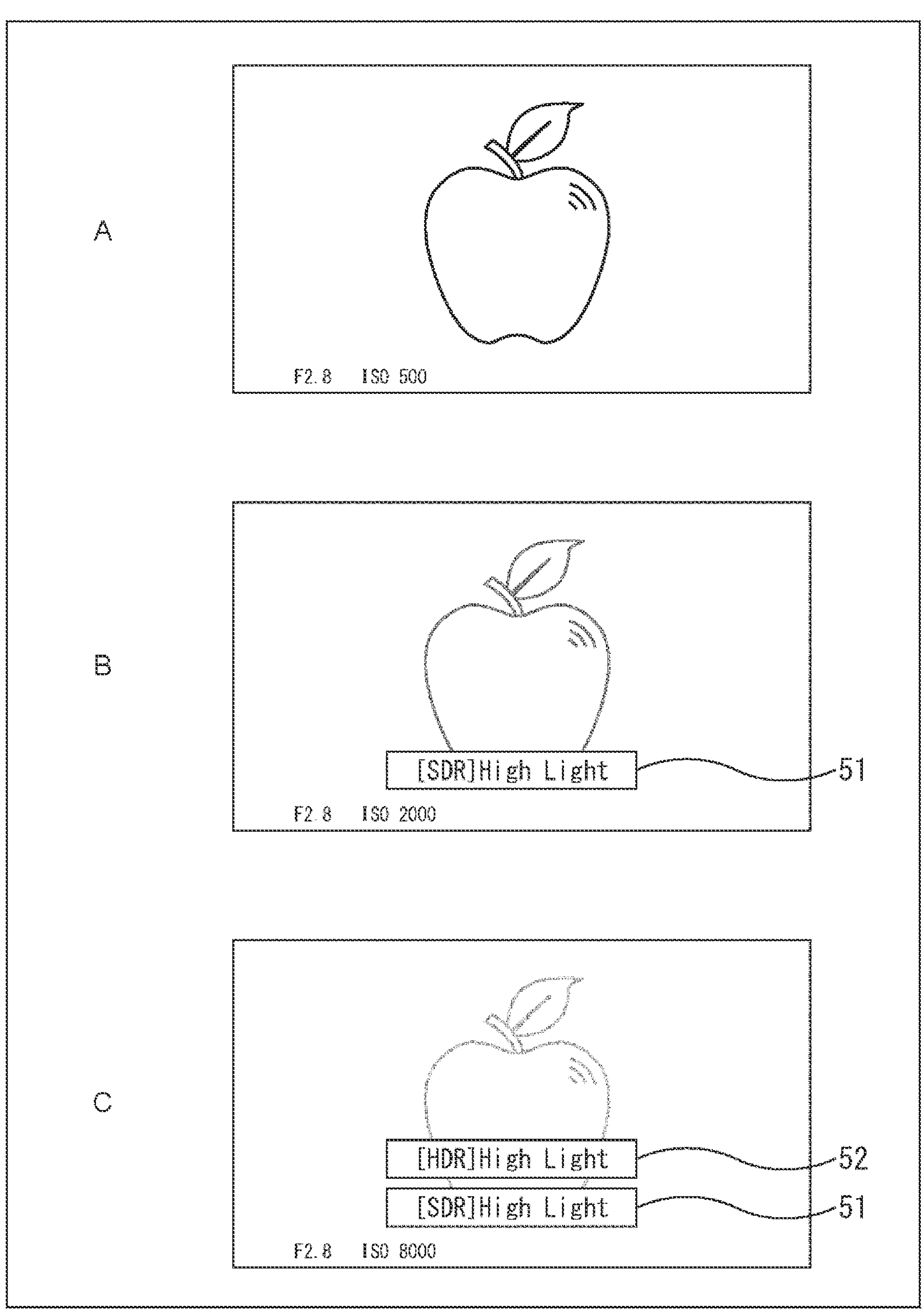
FIG. 4 is a view illustrating an example of display of a highlight warning.

FIG. 4 is a view illustrating an example of display of a highlight warning.

For example, in a case where an f number (F number) is set to 2.8 and International Organization for Standardization (ISO) sensitivity is set to 500, SDR video in which an apple as a subject is imaged with appropriate exposure is displayed as illustrated in A of FIG. 4.

For example, in a case where the f number is set to 2.8 and the ISO sensitivity is set to 2000, SDR video is in an overexposed state. In this case, as illustrated in B of FIG. 4, a highlight warning 51 is superimposed on the SDR video and displayed on the display unit 8. The highlight warning 51 is SDR exposure information for warning the cameraman that the exposure of the SDR video is in a highlight state. In the example in B of FIG. 4, the text "[SDR] High Light" is displayed in a pop-up manner, as the highlight warning 51.

For example, in a case where the f number is set to 2.8 and the ISO sensitivity is set to 8000, SDR video and HDR video are in an overexposed state. In this case, as illustrated in C of FIG. 4, a highlight warning 52, together with the highlight warning 51, is superimposed on the SDR video and displayed on the display unit 8. The highlight warning 52 is HDR exposure information for warning the cameraman that the exposure of the HDR video is in a highlight state. In the example in C of FIG. 4, the text "[HDR] High Light" is displayed in a pop-up manner, as the highlight warning 52.

On the display unit 8, for example, the highlight warning 51 is displayed in a case where the brightness of the subject seen in the SDR video is equal to or greater than an upper limit threshold TH_H_SDR, and the highlight warning 52 is displayed in a case where the brightness of the subject seen in the HDR video is equal to or greater than an upper limit threshold TH_H_HDR.

In a case where an SDR gain is fixed, the upper limit threshold TH_H_SDR and the upper limit threshold TH_H_HDR have a relationship of TH_H_SDR≤TH_H_HDR because HDR can express a high-luminance side more widely than SDR. Therefore, as the setting value of the ISO sensitivity is gradually increased, the highlight warning 51 for the SDR video is displayed earlier, and the highlight warning 52 for the HDR video is displayed later.

As described above, in a case where at least one of SDR video or HDR video is in a highlight state, a highlight warning is displayed to express that exposure is in a highlight state. This allows the cameraman to check whether or not each of the exposure of the SDR video and the exposure of the HDR video is in a highlight state while checking the SDR video.

Note that, in a case where the brightness of the subject seen in the SDR video is equal to or smaller than a lower limit threshold TH_L_SDR, a low-light warning for warning the cameraman that the exposure of the SDR video is in a low-light state may be displayed, and in a case where the brightness of the subject seen in the HDR video is equal to or smaller than a lower limit threshold TH_L_HDR, a low-light warning for warning the cameraman that the exposure of the HDR video is in a low-light state may be displayed.

In this case, the lower limit threshold TH_L_SDR and the lower limit threshold TH_L_HDR have a relationship of TH_L_SDR≥TH_L_SDR.

Example of Display of Waveform

Figure 5:
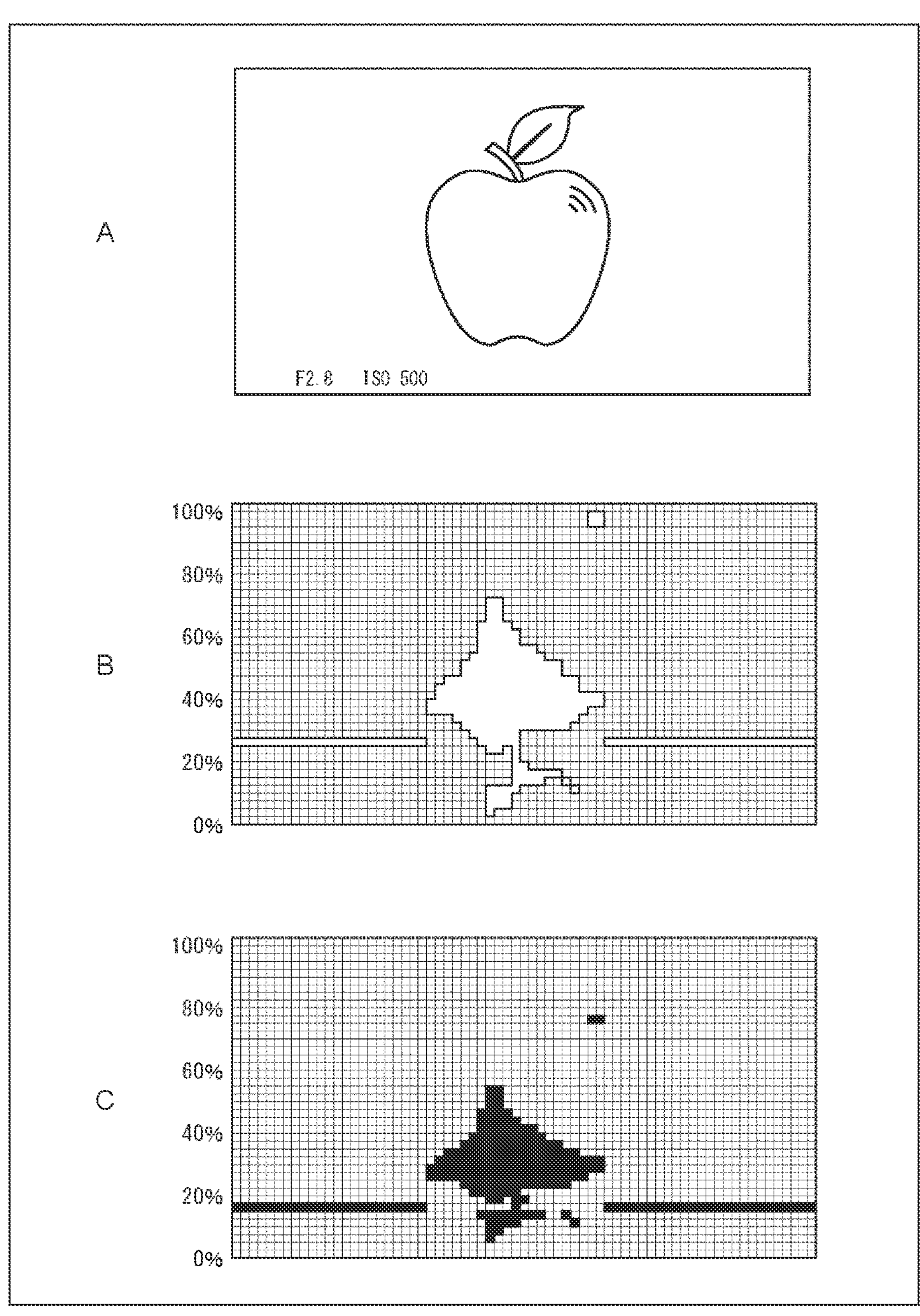
FIG. 5 is a view illustrating an example of a waveform.

FIG. 5 is a view illustrating an example of a waveform.

For example, in a case where the f number is set to 2.8 and the ISO sensitivity is set to 500, suppose that SDR video in which an apple as a subject is seen is acquired as illustrated in A of FIG. 5.

In this case, the SDR exposure detection unit 41 detects the brightness of each line in the vertical direction of the SDR video on the basis of a video signal. For example, the SDR exposure detection unit 41 detects a luminance level indicating the brightness in Institude of radio engineers (IRE) units that takes into account a parameter used in SDR signal processing performed by the SDR signal processing unit 4.

The SDR exposure-information calculation unit 32 plots the luminance level of each line on the basis of the SDR detection signal indicating a result of detection by the SDR exposure detection unit 41, thereby generating a waveform of the SDR video illustrated in B of FIG. 5, as SDR exposure information. In B of FIG. 5, the horizontal axis represents a line, and the vertical axis represents a luminance level in IRE units (0 to 100%).

Furthermore, the HDR exposure detection unit 42 detects the brightness of each line in the vertical direction of HDR video on the basis of a video signal. For example, the HDR exposure detection unit 42 detects a luminance level indicating the brightness in IRE units that takes into account a parameter used in HDR signal processing performed by the HDR signal processing unit 6.

The HDR exposure-information calculation unit 33 plots the luminance level of each line on the basis of the HDR detection signal indicating a result of detection by the HDR exposure detection unit 42, thereby generating a waveform of the HDR video illustrated in C of FIG. 5, as HDR exposure information. In C of FIG. 5, the horizontal axis represents a line, and the vertical axis represents a luminance level in IRE units (0 to 100%).

Figure 6:
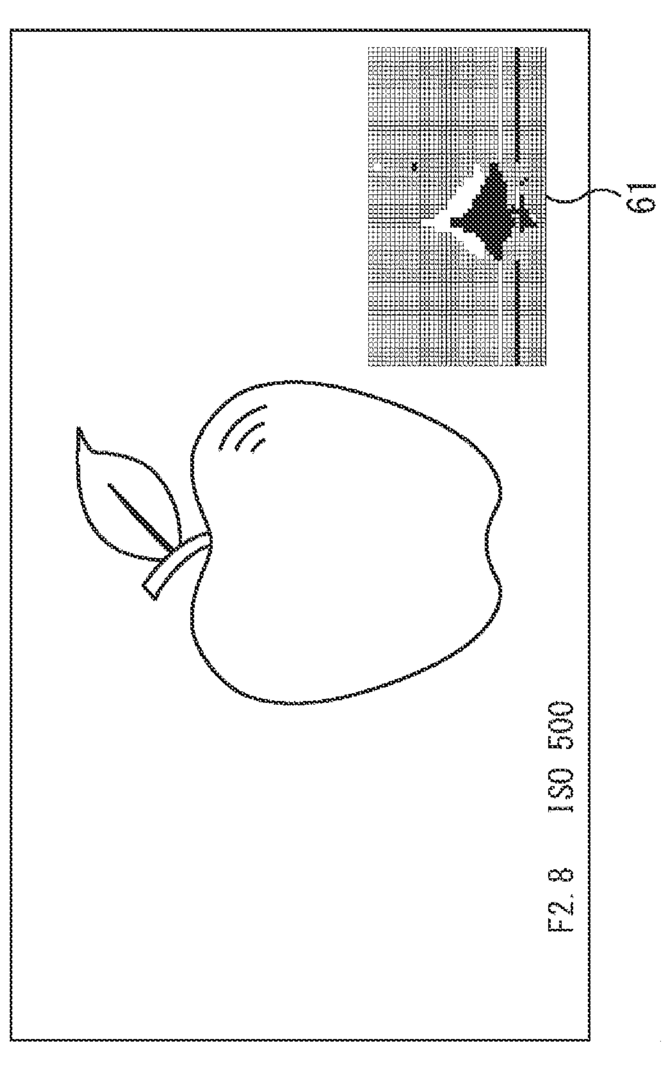
FIG. 6 is a view illustrating an example of display of a waveform.

FIG. 6 is a view illustrating an example of display of a waveform.

As illustrated in FIG. 6, for example, a waveform 61 in which a waveform of SDR video and a waveform of HDR video are superimposed on each other are displayed while being superimposed on a lower portion of the right side in the SDR video. In FIG. 6, the waveform of the SDR video is white-filled, and the waveform of the HDR video is black-filled, but, actually, the respective waveforms may be displayed in the same color. Furthermore, the transmittance may be set and displayed in each of the waveforms.

The waveform in which the vertical axis represents the luminance level in IRE units that takes into account a parameter of SDR signal processing or a parameter of HDR signal processing is generated. Hence, in a case where the exposure is adjusted to an appropriate exposure, the luminance level of the waveform of the HDR video is considered to be lower than the luminance level of the waveform of the SDR video as a whole. Therefore, in the example of FIG. 6, in order to increase the visibility of each waveform, the waveform of the HDR video is displayed while being superimposed on the front surface of the waveform of the SDR video.

In a case where the waveform of the HDR video is displayed while being superimposed on the front surface of the waveform of the SDR video, in order to improve the visibility of the waveform of the SDR video, the opacity of the waveform of the SDR video can be set to higher than the opacity of the waveform of the HDR video for display.

Note that, as the SDR exposure information and the HDR exposure information, a histogram may be displayed on the display unit 8, instead of a waveform.

Example in which Zebra Display is Performed

Figure 7:
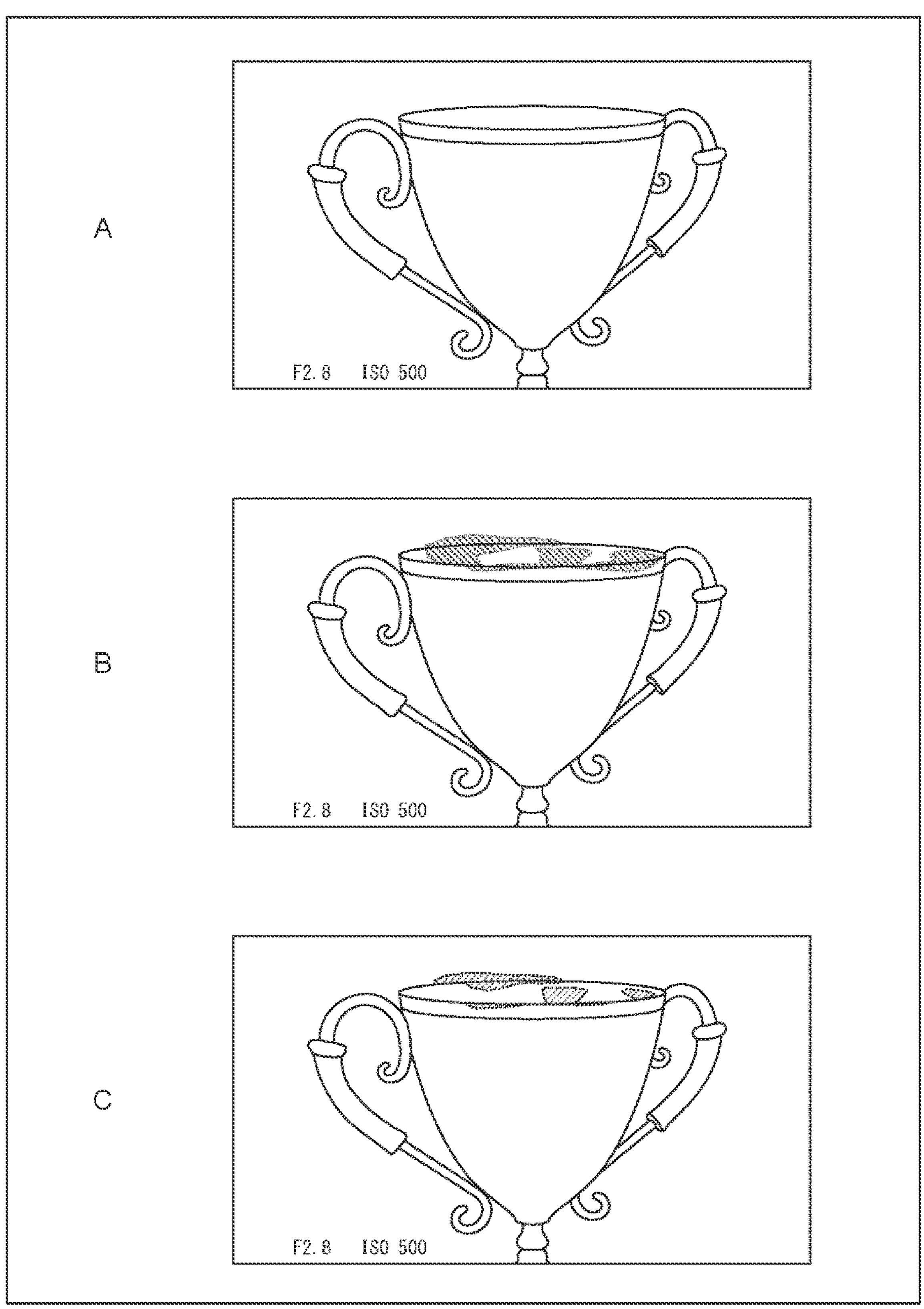
FIG. 7 is a view illustrating an example of a mask used for zebra display.

FIG. 7 is a view illustrating an example of a mask used for zebra display.

For example, in a case where the f number is set to 2.8 and the ISO sensitivity is set to 500, suppose that SDR video in which a cup as a subject is imaged is acquired as illustrated in A of FIG. 7.

In this case, for example, as illustrated in B of FIG. 7, the SDR exposure-information calculation unit 32 generates a zebra-pattern mask indicating a region where the brightness such as a luminance level has a value equal to or greater than a threshold in SDR video, as SDR exposure information. Furthermore, as illustrated in C of FIG. 7, the HDR exposure-information calculation unit 33 generates a zebra-pattern mask indicating a region where the brightness such as a luminance level has a value equal to or greater than a threshold value in HDR video, as HDR exposure information. For example, the cameraman can set a threshold for generating a mask by operating the user operation unit 10.

Note that, for example, the mask serving as the SDR exposure information and the mask serving as the HDR exposure information are displayed in different colors or are displayed with oblique lines at different angles.

Figure 8:
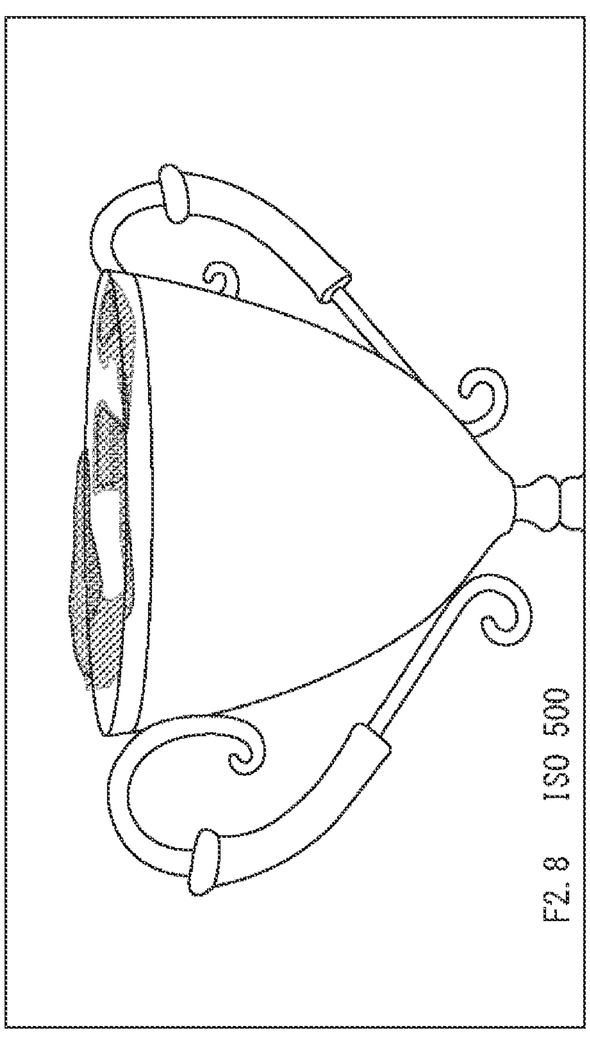
FIG. 8 is a view illustrating an example of zebra display.

FIG. 8 is a view illustrating an example of zebra display.

As illustrated in FIG. 8, for example, a mask serving as SDR exposure information and a mask serving as HDR exposure information are displayed while being superimposed on SDR video, to achieve zebra display. For example, by providing setting in which zebra display is produced at a high-luminance region, it is possible to check occurrence of brown-out highlights of a reflection surface of a cup as a subject by viewing display on the display unit 8.

Operation of Imaging Device

Figure 9:
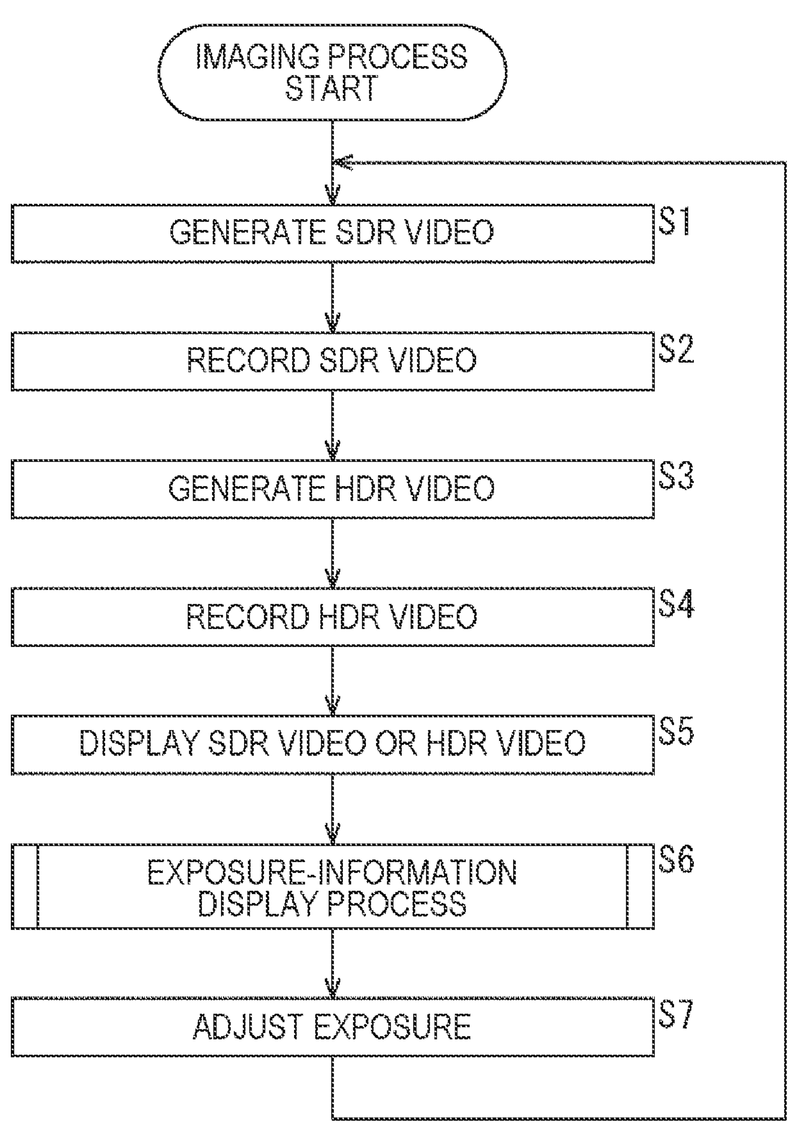
FIG. 9 is a flowchart illustrating an imaging process of the imaging device.

An imaging process of the imaging device having the above-described configuration will be described with reference to a flowchart of FIG. 9. For example, the imaging process in FIG. 9 is started while the imaging element 3 is outputting a video signal.

In a step S1, the SDR signal processing unit 4 performs SDR signal processing on the video signal to generate SDR video.

In a step S2, the SDR recording unit 5 records the SDR video thereon.

In a step S3, the HDR signal processing unit 6 performs HDR signal processing on the video signal to generate HDR video.

In a step S4, the HDR recording unit 7 records the HDR video thereon.

In a step S5, the display unit 8 displays the SDR video or the HDR video.

In a step S6, the imaging device performs an exposure-information display process. As a result of the exposure-information display process, SDR exposure information and HDR exposure information are generated, and are displayed while being superimposed on the SDR video or the HDR video. Details of the exposure-information display process will be given later with reference to FIG. 10.

In a step S7, the exposure adjusting unit 11 controls each exposure adjusting member in accordance with an operation performed by the cameraman, to adjust exposure of the SDR video and exposure of the HDR video. For example, in a case where no operation has been performed by the cameraman, the process of the step S7 is skipped.

After the exposure of the SDR video and the exposure of the HDR video are adjusted, the process returns to the step S1, and the later processes are repeatedly performed.

Figure 10:
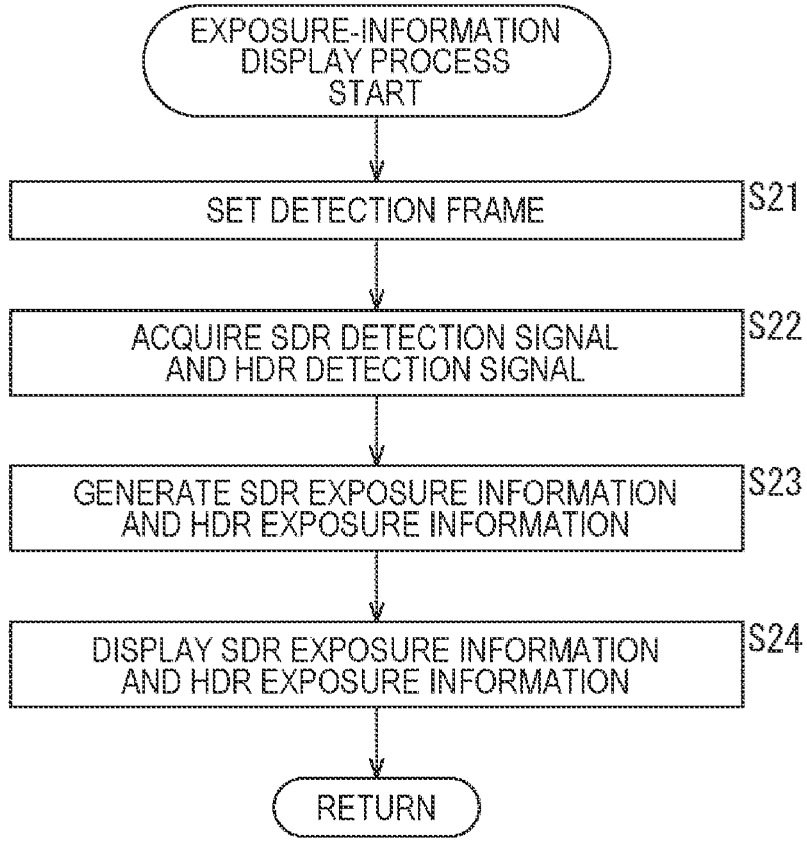
FIG. 10 is a flowchart illustrating an exposure-information display process performed in a step S6 in FIG. 9.

The exposure-information display process performed in the step S6 in FIG. 9 will be described with reference to a flowchart of FIG. 10.

In a step S21, the SDR exposure detection unit 41 and the HDR exposure detection unit 42 respectively set detection frames each surrounding a detection region within the imaging range of the video signal.

In a step S22, the SDR exposure detection unit 41 performs detection in the detection region of the SDR video and acquires an SDR detection signal. The HDR exposure detection unit 42 performs detection in the detection region of the HDR video and acquires an HDR detection signal.

In a step S23, the SDR exposure-information calculation unit 32 generates SDR exposure information on the basis of the SDR detection signal. The HDR exposure-information calculation unit 33 generates HDR exposure information on the basis of the HDR detection signal.

In a step S24, the display unit 8 displays the SDR exposure information and the HDR exposure information while superimposing the information on the SDR video or the HDR video. Here, a highlight warning, a waveform, a zebra-pattern mask, and the like described above are displayed as the SDR exposure information and the HDR exposure information.

Note that a false color image may be displayed as the SDR exposure information and the HDR exposure information. It is not desirable to superimpose a false color image of the SDR video and a false color image of the HDR video on each other for display because to do so results in overlap of the respective colors of the false color images.

Thus, the imaging device detects a main subject seen in the SDR video and the HDR video, and divides a display region of the SDR video or the HDR video with the main subject as a reference. Here, the display region is divided in a direction in which the symmetry of the main subject increases. For example, in a case where the main subject is a person, the display region is divided into the right and the left with respect to the person. The display unit 8 displays the false color image of the SDR video on one of the regions into which the display region has been divided, and displays the false color image of the HDR video on the other region, to superimpose the false color image of the SDR video and the false color image of the HDR video on the SDR video or the HDR video.

A waveform or a histogram expresses a luminance level of each line, whereas a false color image can represent a luminance level at any two-dimensional position.

After the SDR exposure information and the HDR exposure information are displayed on the display unit 8, the process returns to the step S6 in FIG. 9, and the later processes are performed.

As described above, in the imaging device, the SDR exposure information and the HDR exposure information, together with the SDR video or the HDR video, are displayed. The cameraman views the display on one screen provided by the display unit 8, to appropriately adjust the exposure of each video while checking both pieces of the exposure information about the SDR video and the HDR video. For example, the cameraman can adjust the exposure of the SDR video while viewing the SDR video displayed on the display unit 8, and can adjust the exposure of the HDR video while viewing the HDR exposure information and envisioning the HDR video.

3. Second Embodiment

Configuration of Imaging Device

FIG. 11 is a block diagram illustrating an example of a second configuration of the imaging device. In FIG. 11, the same components as the components in FIG. 2 are denoted by the same reference signs. Redundant description will be omitted as appropriate.

The configuration of the imaging device illustrated in FIG. 11 is different from the configuration of the imaging device in FIG. 2 in that the user operation unit 10 is not provided and a touch panel 71 and a detection-region designation unit 72 are provided. Furthermore, the configuration of the imaging device illustrated in FIG. 11 is different from the configuration of the imaging device in FIG. 2 in that an exposure detection unit 73 is provided instead of the exposure detection unit 31.

The touch panel 71 is stacked on the display unit 8. The cameraman can designate a detection region by operating the touch panel 71. The touch panel 71 senses an operation of the cameraman and supplies information indicating a region designated by the cameraman, to the detection-region designation unit 72.

The detection-region designation unit 72 converts the information supplied from the touch panel 71 into coordinates, and supplies information indicating the coordinates of the detection region, to the exposure detection unit 73.

FIG. 12 is a block diagram illustrating an example of a configuration of the exposure detection unit 73. In FIG. 12, the same components as the components in FIG. 3 are denoted by the same reference signs. Redundant description will be omitted as appropriate.

The configuration of the exposure detection unit 73 illustrated in FIG. 12 is different from the configuration of the exposure detection unit 31 in FIG. 3 in that a face detection unit 81 is provided.

The face detection unit 81 is supplied with the same video signal as a video signal supplied to the SDR exposure detection unit 41 and the HDR exposure detection unit 42, from the imaging element 3. The face detection unit 81 detects a face seen in SDR video and HDR video on the basis of a video signal, and supplies information indicating the coordinates of the face on the SDR video or the HDR video, to the SDR exposure detection unit 41, the HDR exposure detection unit 42, and the exposure adjusting unit 11.

The SDR exposure detection unit 41 and the HDR exposure detection unit 42 are supplied with information indicating the coordinates of the detection region designated by the cameraman, from the detection-region designation unit 72.

The SDR exposure detection unit 41 sets a detection frame in the face region seen in the SDR video on the basis of the information supplied from the face detection unit 81, and detects the brightness of the face region. For example, in a case where the brightness of the entire imaging range is detected before the face is detected, after detection of the face, the SDR exposure detection unit 41 detects the brightness of the face region while continuing detecting the brightness of the entire imaging range.

Furthermore, the SDR exposure detection unit 41 sets a detection frame in a region designated by the cameraman on the basis of the information supplied from the detection-region designation unit 72, and detects the brightness of the region. Also in this case, as in the case where the brightness of the face region is detected, the brightness of the region designated by the cameraman is detected while the brightness of the region having been detected before the designation of the region by the cameraman is kept detected.

The HDR exposure detection unit 42 further sets a detection frame in the region of the face seen in the HDR video on the basis of the information supplied from the face detection unit 81, and detects the brightness of the face region. For example, in a case where the brightness of the entire imaging range is detected before the face is detected, after detection of the face, the HDR exposure detection unit 42 detects the brightness of the face region while continuing detecting the brightness of the entire imaging range.

Furthermore, the HDR exposure detection unit 42 sets a detection frame in the region designated by the cameraman, on the basis of the information supplied from the detection-region designation unit 72, and detects the brightness of the region. Also in this case, as in the case where the brightness of the face region is detected, the brightness of the region designated by the cameraman is detected while the brightness of the region having been detected before the designation of the region by the cameraman is kept detected.

Referring back to FIG. 11, the exposure adjusting unit 11 calculates an appropriate exposure amount on the basis of, for example, the information indicating the coordinates of the face detected by the face detection unit 81, the brightness of the face region detected by the SDR exposure detection unit 41, and the brightness of the face region detected by the HDR exposure detection unit 42, and controls each exposure adjusting member.

The information indicating the detection frame set in the region designated by the cameraman, the face region, or the like is supplied from the exposure detection unit 31 to the display unit 8 via a path not illustrated in FIG. 11. The display unit 8 displays the detection frame while superimposing the detection frame on the SDR video or the HDR video.

Note that, in FIG. 11, an example in which the user operation unit 10 is not provided has been described, but the user operation unit 10 may be provided in the imaging device. In such a case, the touch panel 71 may be included in the user operation unit 10.

Example of Display of SDR Exposure Information and HDR Exposure Information

Figure 13:
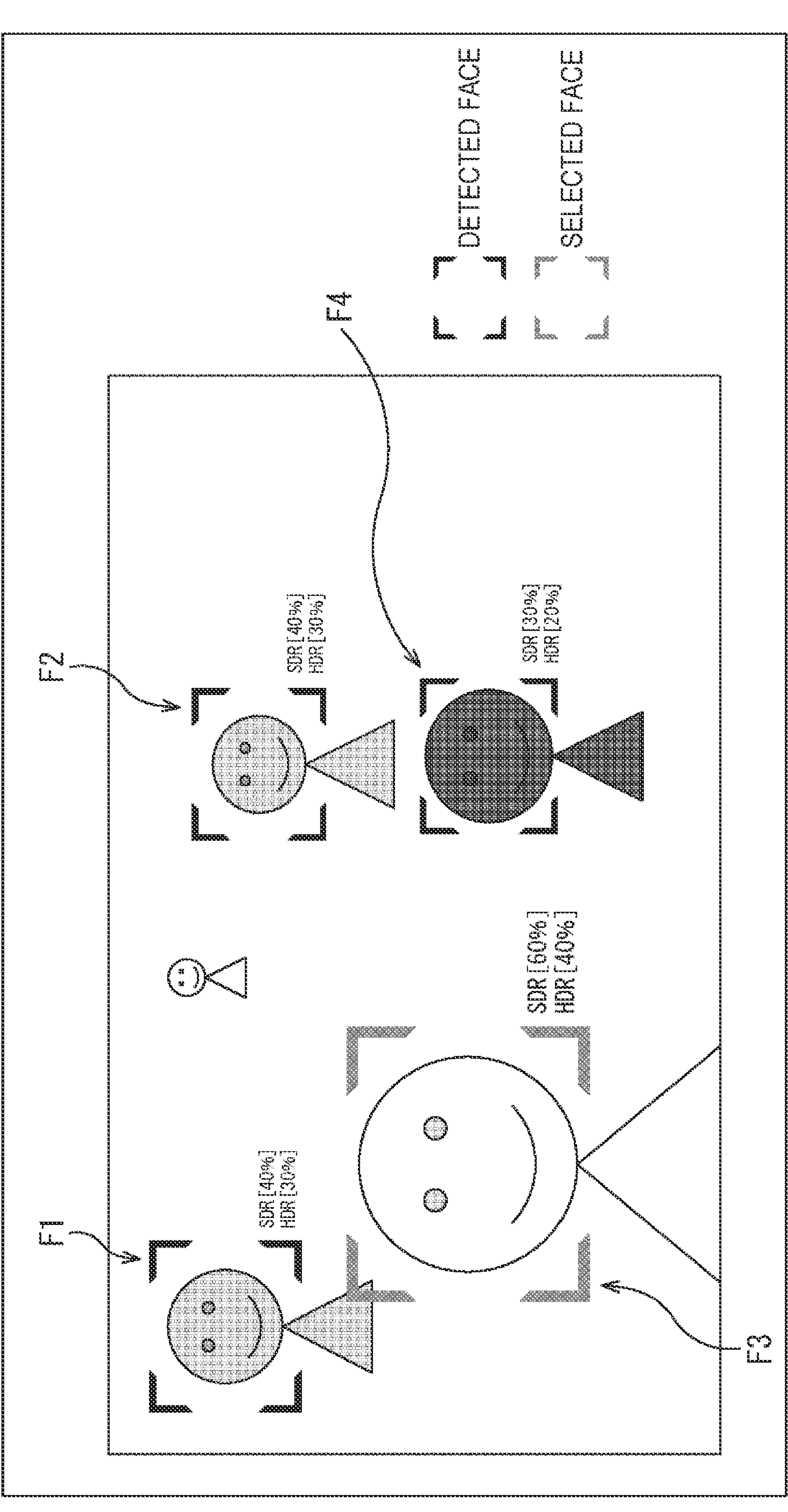
FIG. 13 is a view illustrating an example of display of a luminance level of a face region.

FIG. 13 is a view illustrating an example of display of luminance levels in a face region.

In the example of FIG. 13, SDR video in which five persons are seen is displayed on the display unit 8. For example, suppose that the face detection unit 81 can detect the faces of four persons among the five persons seen in the SDR video. In this case, the display unit 8 displays detection frames F1 to F4 defining the face regions of the respective persons detected by the face detection unit 81 while superimposing the detection frames on the SDR video.

The SDR exposure detection unit 41 and the HDR exposure detection unit 42 detect luminance levels in IRE units as the brightness of each region defined by the detection frames F1 to F4. The display unit 8 displays the luminance level detected by the SDR exposure detection unit 41 and the luminance level detected by the HDR exposure detection unit 42 in each region defined by the detection frames F1 to F4, side by side, for example, on the right side of the lower portion of each of the detection frames F1 to F4, as the SDR exposure information and the HDR exposure information.

In the example of FIG. 13, on the right side of the lower portion of each of the detection frame F1 and detection frame F2, it is shown that the luminance level of the SDR video is 408, and the luminance level of the HDR video is 308. On the right side of the lower portion of the detection frame F3, it is shown that the luminance level of the SDR video is 60%, and the luminance level of the HDR video is 408. On the right side of the lower portion of the detection frame F4, it is shown that the luminance level of the SDR video is 30%, and the luminance level of the HDR video is 20%.

The cameraman selects one of the regions defined by the detection frames F1 to F4 by operating the touch panel 71 or the like, thereby designating a main subject, in other words, a principal subject. In FIG. 13, the face of the person surrounded by the detection frame F3 is selected as a main subject. Among the luminance levels in the respective regions defined by the detection frames F1 to F4, only the luminance level of the face region selected as a main subject may be displayed on the display unit 8.

Note that a main subject such as a face, a body part, or an object may be inferred using an inference model generated by machine learning. Instead of a face region, a part of a face region such as an eye region seen in SDR video or HDR video, or a region other than a face, may be detected by the face detection unit 81.

Figure 14:
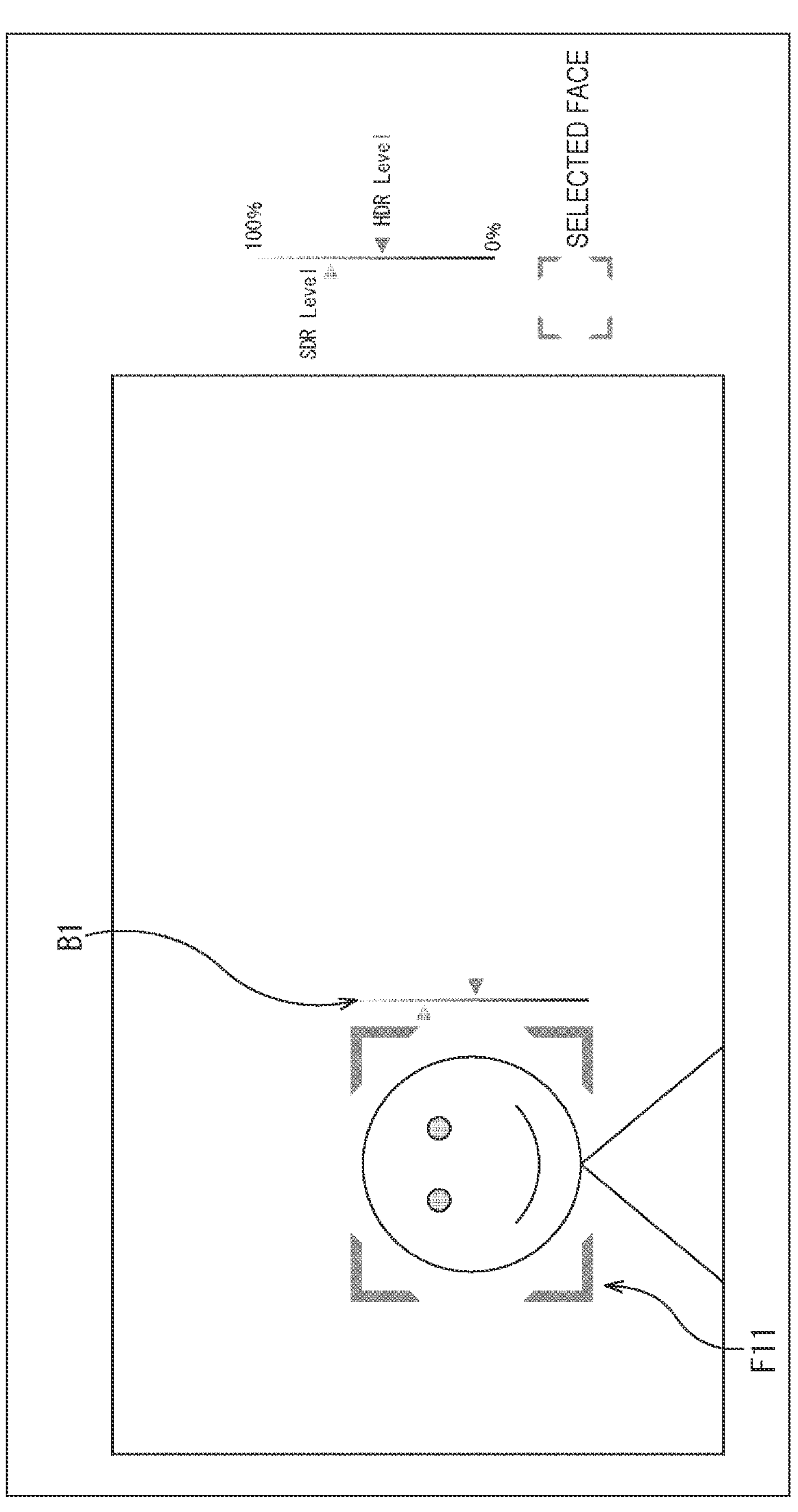
FIG. 14 is a view illustrating another example of display of a luminance level of a face region.

FIG. 14 is a view illustrating another example of display of luminance levels of a face region.

In the example of FIG. 14, SDR video in which one person is seen and a detection frame F11 surrounding the person are displayed on the display unit 8. As illustrated in FIG. 14, a signal level bar B1 indicating the luminance level of the SDR video and the luminance level of HDR video is displayed, for example, on the right side of the detection frame F11, as SDR exposure information and HDR exposure information.

A pointer on the left side of the signal level bar B1 indicates the luminance level of the SDR video, and a pointer on the right side indicates the luminance level of the HDR video.

Figure 15:
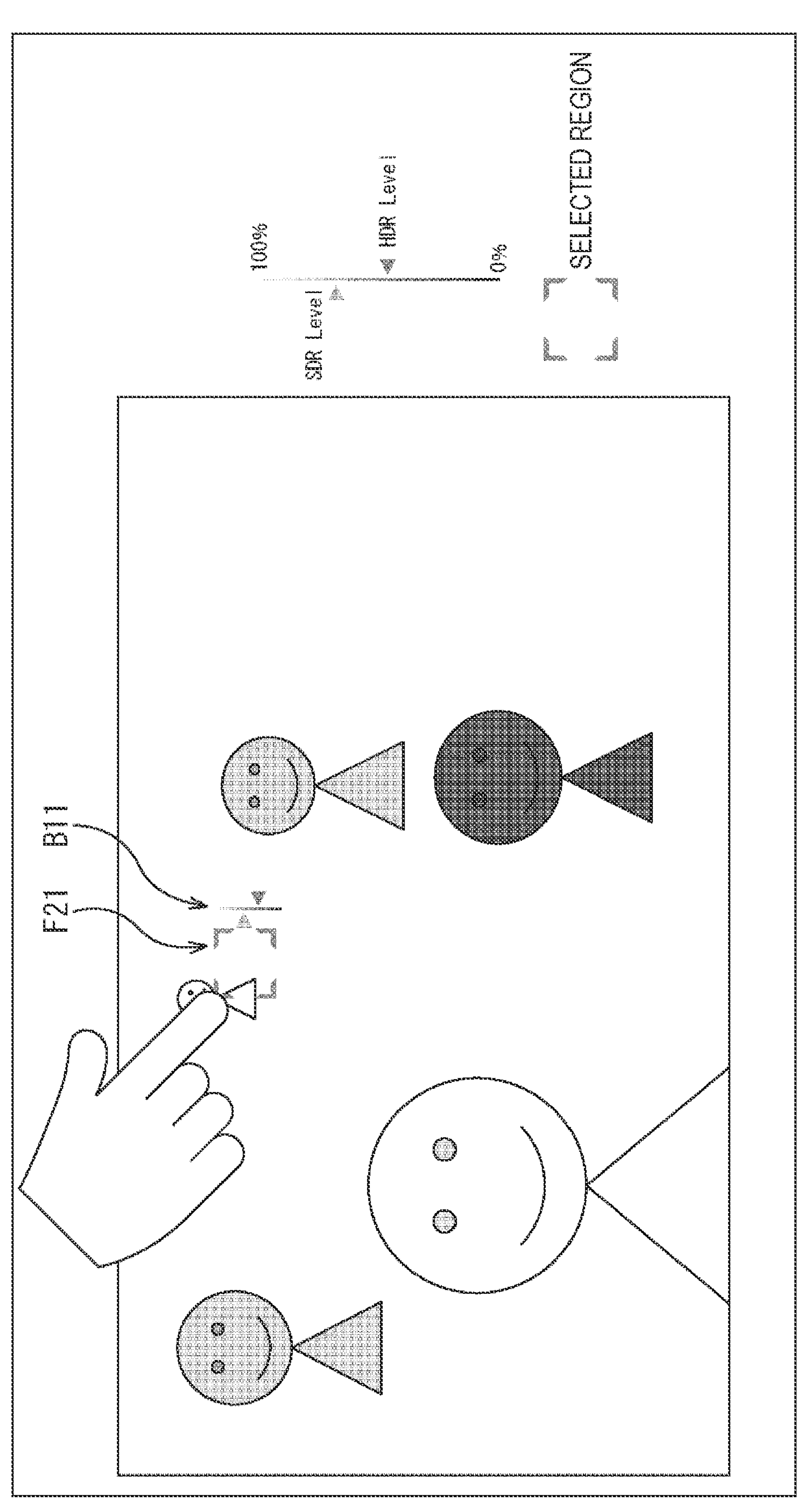
FIG. 15 is a view illustrating an example of display of a luminance level of a region designated by a cameraman.

FIG. 15 is a view illustrating an example of display of a luminance level of a region designated by the cameraman.

As illustrated in FIG. 15, a detection frame F21 defining the region designated by the cameraman using the touch panel 71 is displayed. A signal level bar B11 indicating the luminance level of the SDR video and the luminance level of the HDR video in the region designated by the cameraman is displayed on the right side of the detection frame F21.

The cameraman can designate not only a person but also other things, with a high degree of freedom, as a main subject. Furthermore, the cameraman can check whether or not blown-out highlights or blocked-up shadows occur in a partial region or the like in the background by, for example, designating the partial region and viewing the signal level bar B11.

Note that it is also possible to cause the imaging device to recognize a subject designated by the cameraman so that a detection frame can automatically follow the subject being moving.

Operation of Imaging Device

Also in the second embodiment, the imaging device basically performs a process similar to the imaging process described with reference to the flowchart of FIG. 9. The operation of the imaging device according to the second embodiment is different from the operation of the imaging device in the first embodiment in the exposure-information display process performed in the step S6.

The exposure-information display process performed in a step S8 in FIG. 9 will be described with reference to a flowchart of FIG. 16.

In a step S31, the detection-region designation unit 72 determines whether or not an operation using the touch panel 71 has been performed by the cameraman.

In a case where it is determined in the step S31 that an operation has been performed by the cameraman, the detection-region designation unit 72 determines whether the operation performed by the cameraman is an operation for setting a detection region or an operation for canceling setting of a detection region, in a step S32.

In a case where it is determined in the step S32 that the operation performed by the cameraman is an operation for setting a detection region, the detection-region designation unit 72 designates the region designated by the cameraman as a detection region where the SDR exposure detection unit 41 and the HDR exposure detection unit 42 are to perform detection, in the step S33. Specifically, the detection-region designation unit 72 supplies information indicating the coordinates of the region designated by the cameraman, to the SDR exposure detection unit 41 and the HDR exposure detection unit 42.

In a step S34, the detection-region designation unit 72 restricts display of a luminance level of a face region.

In a step S35, the SDR exposure detection unit 41 and the HDR exposure detection unit 42 respectively set detection frames in the region designated by the cameraman.

In a step S36, the SDR exposure detection unit 41 acquires an SDR detection signal indicating the brightness of the region designated by the cameraman in the SDR video, and the HDR exposure detection unit 42 acquires an HDR detection signal indicating the brightness of the region designated by the cameraman in the HDR video.

In a step S37, the SDR exposure detection unit 41 acquires a parameter used for SDR signal processing, and the HDR exposure detection unit 42 acquires a parameter used for HDR signal processing.

In a step S38, the SDR exposure detection unit 41 converts the SDR detection signal into a signal of a luminance level in IRE units on the basis of the parameter used for SDR signal processing. The HDR exposure detection unit 42 converts the HDR detection signal into a signal of a luminance level in IRE units on the basis of the parameter used for HDR signal processing.

In a step S39, the display unit 8 displays a detection frame defining the region designated by the cameraman.

In a step S40, the SDR exposure-information calculation unit 32 generates SDR exposure information indicating the luminance level of the region designated by the cameraman in the SDR video, on the basis of the SDR detection signal, and displays the SDR exposure information on the display unit 8. The HDR exposure-information calculation unit 33 generates HDR exposure information indicating the luminance level of the region designated by the cameraman in the HDR video, on the basis of the HDR detection signal, and displays the HDR exposure information on the display unit 8.

On the other hand, in a case where it is determined in the step S32 that the operation performed by the cameraman is an operation for canceling setting of a detection region, the detection-region designation unit 72 cancels designation of a detection region in a step S41.

In a step S42, the display unit 8 hides the SDR exposure information and the HDR exposure information indicating the luminance levels.

In a step S43, the display unit 8 hides the detection frame.

In a step S44, the detection-region designation unit 72 cancels restriction of display of the luminance levels of the face region.

In a case where it is determined in the step S31 that no operation has been performed by the cameraman, the detection-region designation unit 72 determines whether or not display of the luminance level of the face region is restricted, in a step S45.

In a case where it is determined in the step S45 that display of the luminance level of the face region is restricted, processes in and after a step S35 are performed.

On the other hand, in a case where it is determined in the step S45 that display of the luminance level of the face region is not restricted, the imaging device performs the exposure-information display process for the face. By the exposure-information display process for the face, the face of the person seen in the SDR video or the HDR video is detected, and the SDR exposure information and the HDR exposure information indicating the luminance levels of the region of the detected face are displayed on the display unit 8. Details of the exposure-information display process for the face will be given later with reference to a flowchart of FIG. 17.

After any of the process of the step S40, the process of the step S44, and the process of a step S46 is performed, the process returns to the step S8 of FIG. 9, and the later processes are performed.

Figure 17:
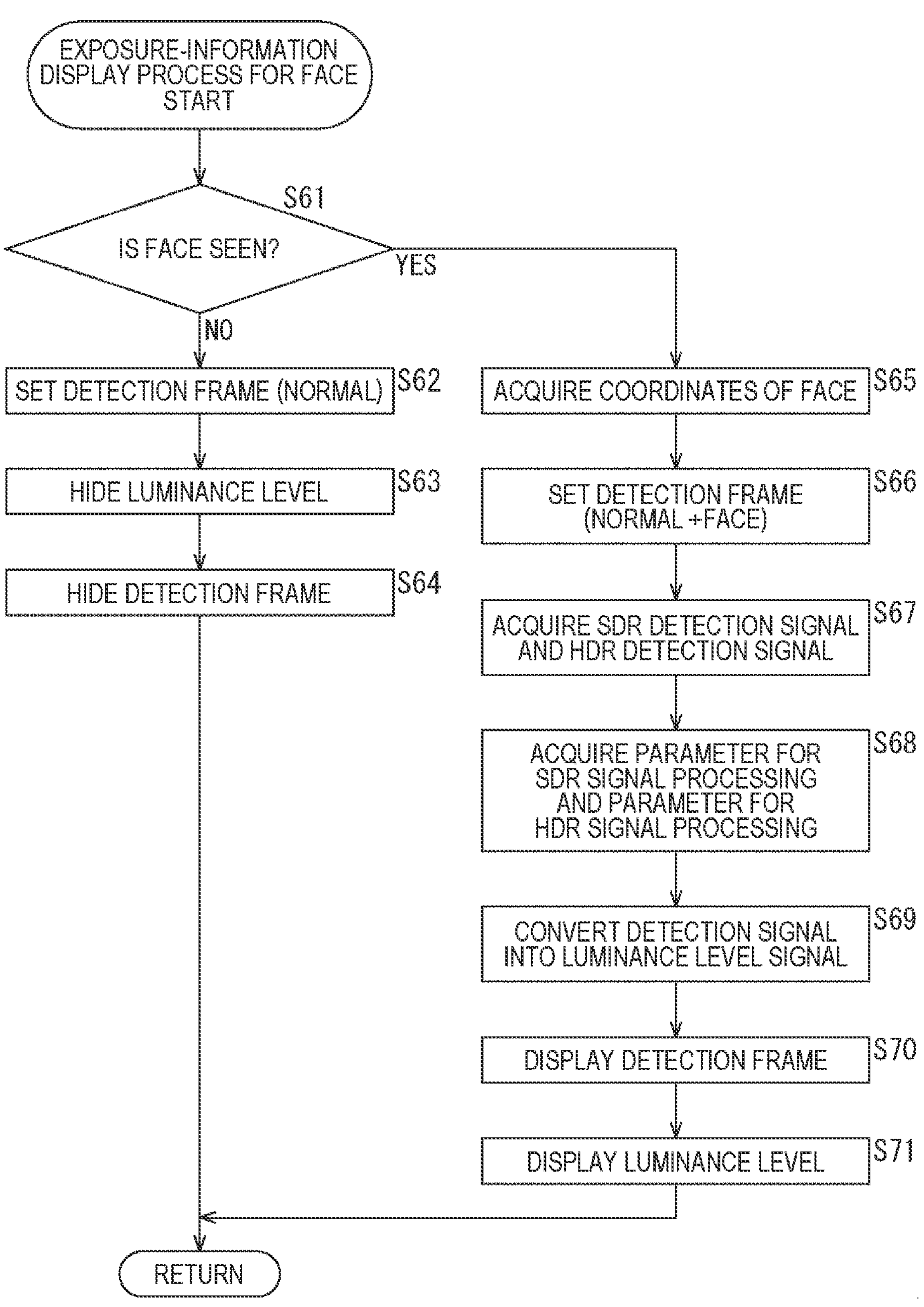
FIG. 17 is a flowchart illustrating an exposure-information display process for a face, performed in a step S46 in FIG. 16.

The exposure-information display process for the face performed in the step S46 in FIG. 16 will be described with reference to the flowchart of FIG. 17.

In a step S61, the face detection unit 81 determines whether a face is seen in the SDR video or the HDR video.

In a case where it is determined in the step S61 that no face is seen, the SDR exposure detection unit 41 and the HDR exposure detection unit 42 set normal detection frames in a step S62. For example, a detection frame is set in the entire region of the SDR video or the HDR video, a region including a center weight, any region set manually by the cameraman, or the like. The detection region set by the SDR exposure detection unit 41 may be the same as or different from the detection region set by the HDR exposure detection unit 42.

In a step S63, the SDR exposure-information calculation unit 32 and the HDR exposure-information calculation unit 33 hide the luminance levels of the face region. The SDR exposure-information calculation unit 32 and the HDR exposure-information calculation unit 33 each hold a list in which a luminance level of a region of each coordinate set of the face is recorded. In a case where no face is seen in the SDR video or the HDR video, this list is blank, and thus the SDR exposure-information calculation unit 32 and the HDR exposure-information calculation unit 33 do not have data to be displayed as the SDR exposure information or the HDR exposure information. Thus, no luminance level of the face region is displayed on the display unit 8.

In a step S64, the display unit 8 hides the detection frame defining the face region.

On the other hand, in a case where it is determined in the step S61 that a face is seen, the SDR exposure detection unit 41 and the HDR exposure detection unit 42 acquire coordinates of the face on the SDR video or the HDR video from the face detection unit 81, in a step S65.

In a step S66, the SDR exposure detection unit 41 and the HDR exposure detection unit 42 set detection frames in the region indicated by the coordinates of the face acquired in the step S61, in addition to the normal detection frames.

In a step S67, the SDR exposure detection unit 41 acquires an SDR detection signal indicating the brightness of the face region in the SDR video, and the HDR exposure detection unit 42 acquires an HDR detection signal indicating the brightness of the face region in the HDR video.

In a step S68, the SDR exposure detection unit 41 acquires a parameter used for SDR signal processing, and the HDR exposure detection unit 42 acquires a parameter used for HDR signal processing.

In a step S69, the SDR exposure detection unit 41 converts the SDR detection signal into a signal of a luminance level in IRE units on the basis of the parameter used for SDR signal processing. The HDR exposure detection unit 42 converts the HDR detection signal into a signal of a luminance level in IRE units on the basis of the parameter used for HDR signal processing.

In a step S70, the display unit 8 displays the detection frame defining the face region.

In a step S71, the SDR exposure-information calculation unit 32 generates SDR exposure information indicating the luminance level of the face region in the SDR video, on the basis of the SDR detection signal, and displays the SDR exposure information on the display unit 8. The HDR exposure-information calculation unit 33 generates HDR exposure information indicating the luminance level of the face region in the HDR video, on the basis of the HDR detection signal, and displays the HDR exposure information on the display unit 8.

After the process of the step S64 or the process of the step of S71 is performed, the process returns to the step S46 in FIG. 16, and the later processes are performed.

Note that the coordinates of the face change for each frame, and hence it is desirable that the processes of the steps S65 to S71 are performed in the same frame.

As described above, in the imaging device, the SDR exposure information and the HDR exposure information indicating the luminance levels of the face region, together with the SDR video or the HDR video, are displayed. The cameraman can appropriately adjust exposure of each video by viewing display on one screen provided by the display unit 8 and checking both exposure of the SDR video and exposure of the HDR video in the face region.

4. Third Embodiment

Configuration of Imaging Device

Figure 18:
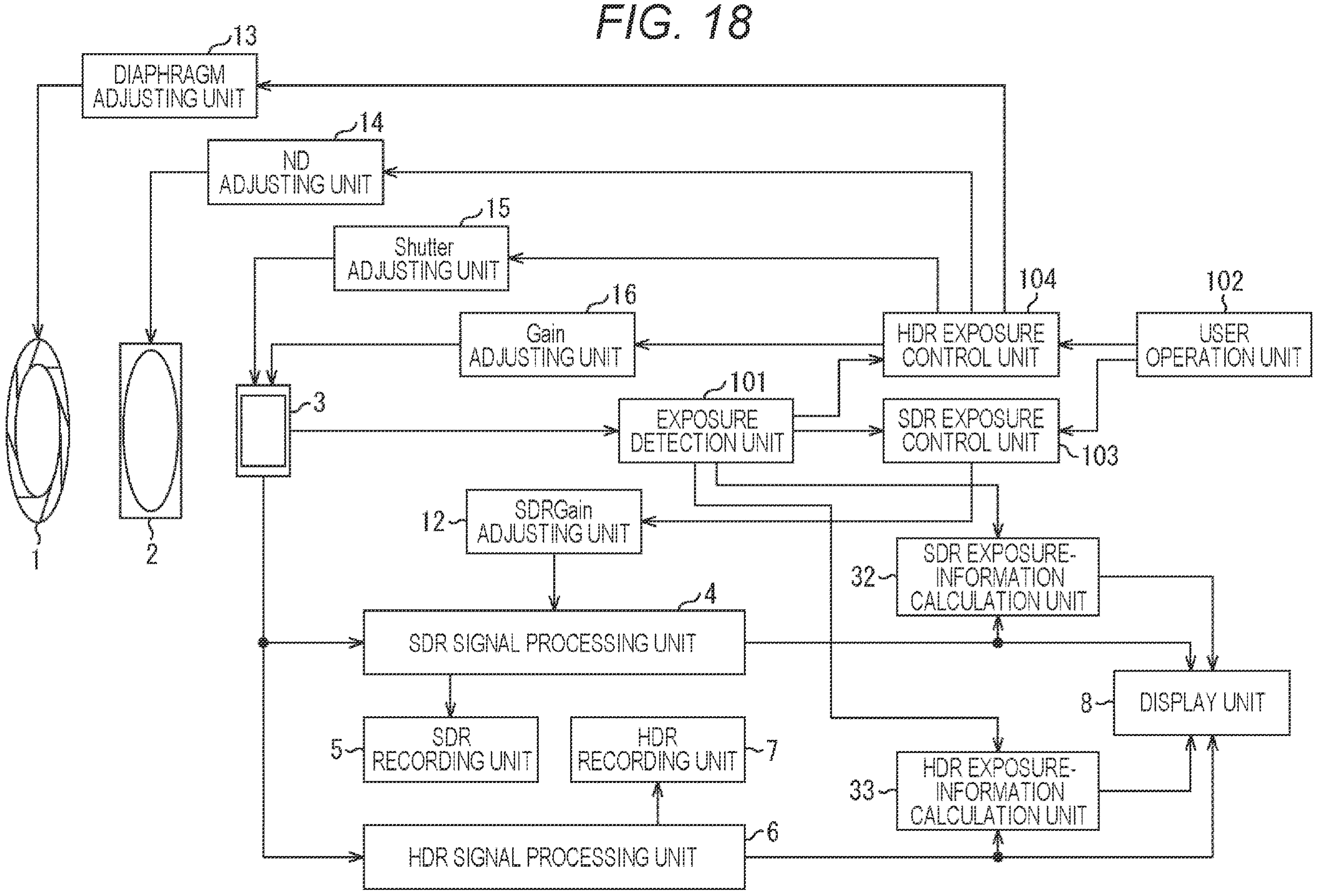
FIG. 18 is a block diagram illustrating an example of a third configuration of the imaging device.

FIG. 18 is a block diagram illustrating an example of a third configuration of the imaging device. In FIG. 18, the same components as the components in FIG. 2 are denoted by the same reference signs. Redundant description will be omitted as appropriate.

The configuration of the imaging device illustrated in FIG. 18 is different from the configuration of the imaging device in FIG. 2 in that an exposure detection unit 101 is provided instead of the exposure detection unit 31 and a user operation unit 102 is provided instead of the user operation unit 10. Furthermore, the configuration of the imaging device illustrated in FIG. 18 is different from the configuration of the imaging device in FIG. 2 in that an SDR exposure control unit 103 and an HDR exposure control unit 104 are provided instead of the exposure adjusting unit 11.

In the imaging device according to the third embodiment illustrated in FIG. 18, the SDR exposure control unit 103 and the HDR exposure control unit 104 automatically control exposure of SDR video and exposure of HDR video.

Figure 19:
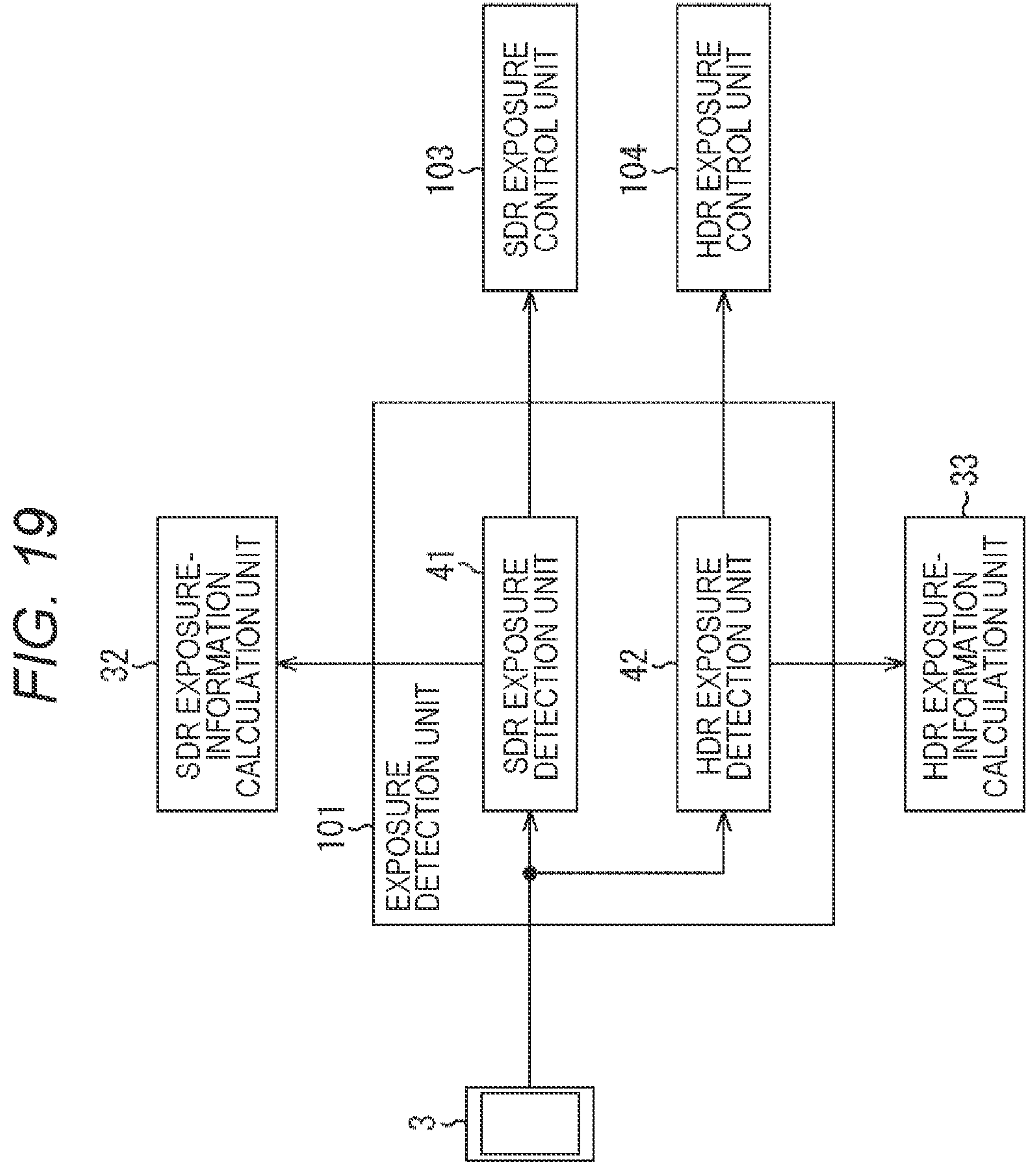
FIG. 19 is a block diagram illustrating an example of a configuration of an exposure detection unit.

FIG. 19 is a block diagram illustrating an example of a configuration of the exposure detection unit 101. In FIG. 19, the same components as the components in FIG. 3 are denoted by the same reference signs. Redundant description will be omitted as appropriate.

The configuration of the exposure detection unit 101 illustrated in FIG. 19 is different from the configuration of the exposure detection unit 31 in FIG. 3 in that the SDR exposure detection unit 41 supplies an SDR detection signal to the SDR exposure control unit 103 and the HDR exposure detection unit 42 supplies an HDR detection signal to the HDR exposure control unit 104.

For example, the SDR exposure detection unit 41 detects luminance as the brightness within the imaging range of SDR video, and obtains a detection value indicating the brightness within the imaging range. The SDR exposure detection unit 41 supplies an SDR detection signal indicating the detection value to the SDR exposure control unit 103.

Instead of luminance, illuminance may be acquired by the SDR exposure detection unit 41, as the brightness within the imaging range of SDR video. The luminance indicates an amount of light incident on the imaging element 3, and the illuminance indicates an amount of light with which a subject in the imaging range is irradiated. In this case, information indicating illuminance in the imaging range detected by a device outside the imaging device, such as an illuminometer, is acquired by the SDR exposure detection unit 41. The illuminance in the imaging range may be obtained by the SDR exposure detection unit 41 on the basis of a video signal.

For example, the HDR exposure detection unit 42 detects luminance as the brightness within the imaging range of HDR video, and obtains a detection value indicating the brightness within the imaging range. The HDR exposure detection unit 42 supplies an HDR detection signal indicating the detection value to the HDR exposure control unit 104.

Instead of luminance, illuminance may be acquired by the HDR exposure detection unit 42, as the brightness within the imaging range of HDR video. In this case, information indicating illuminance in the imaging range detected by a device outside the imaging device, such as an illuminometer, is acquired by the HDR exposure detection unit 42. The illuminance in the imaging range may be obtained by the HDR exposure detection unit 42 on the basis of a video signal.

Referring back to FIG. 18, the user operation unit 102 receives an input of an operation to enable or disable at least one of exposure control of the SDR video by the SDR exposure control unit 103 or exposure control of exposure of the HDR video by the HDR exposure control unit 104.

The SDR exposure control unit 103 controls the SDR exposure adjusting member on the basis of the SDR detection signal supplied from the SDR exposure detection unit 41, in response to the operation, input of which has been received by the user operation unit 102, thereby controlling exposure of the SDR video.

The HDR exposure control unit 104 controls the SDR/HDR exposure adjusting member on the basis of the HDR detection signal supplied from the HDR exposure detection unit 42, in response to the operation, input of which has been received by the user operation unit 102, thereby controlling exposure of the HDR video.

The SDR video and the HDR video have different ranges in which a high-luminance region can be expressed. In imaging of the SDR video, due to a limited range of the SDR video, exposure control in which exposure is adjusted such that the brightest region has a luminance level of approximately 100% is typically performed in order to avoid occurrence of blown-out highlights.

On the other hand, because of a wider range of the HDR video that expresses a high-luminance region, than the range of the SDR video, to adjust exposure relative to the brightest region causes a bias toward a signal on a high-luminance side. Thus, in imaging of the HDR video, to adjust exposure by a method similar to the method of exposure control for imaging of the SDR video makes the entire HDR video too bright.

Generally, in imaging of HDR video, it is preferable that exposure of a region other than a high-luminance region is substantially the same as correct exposure of SDR video. Therefore, it is preferable to perform exposure control focusing on a high-luminance region in imaging of SDR video while performing exposure control focusing on a region other than a high-luminance region or a main subject in imaging of HDR video.

In order to realize such exposure control, in the imaging device according to the third embodiment, the SDR exposure detection unit 41 and the SDR exposure control unit 103 operate in accordance with a first algorithm. Meanwhile, the HDR exposure detection unit 42 and the HDR exposure control unit 104 operate in accordance with a second algorithm different from the first algorithm.

Example of Algorithm

Example of Algorithm with Different Detection Frames

For example, the SDR exposure detection unit 41 sets a detection frame in a predetermined region within the imaging range of a video signal. Meanwhile, the HDR exposure detection unit 42 sets a detection frames in a region different from the detection frame set by the SDR exposure detection unit 41 within the imaging range of the video signal.

Figure 20:
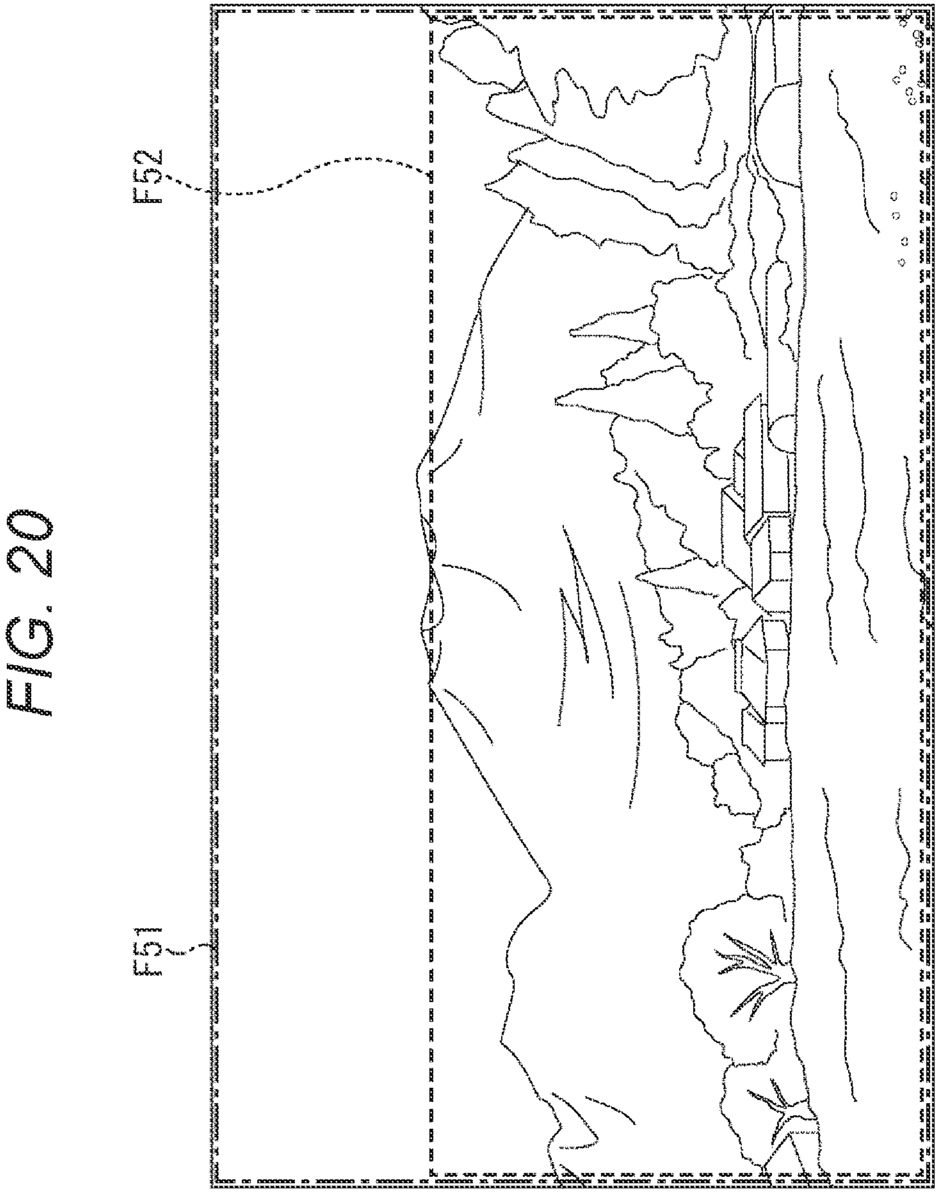
FIG. 20 is a view illustrating an example of detection frames set by an SDR exposure detection unit and an HDR exposure detection unit.

FIG. 20 is a view illustrating an example of detection frames set by the SDR exposure detection unit 41 and the HDR exposure detection unit 42.

As illustrated in FIG. 20, for example, in a case where an outdoor scene is imaged, the SDR exposure detection unit 41 sets a detection frame F51 over the entire region of the imaging range in order to prevent occurrence of blown-out highlights in a high-luminance region in the imaging range.

Meanwhile, the HDR exposure detection unit 42 sets a detection frame F52 in a region other than an upper region in the imaging range in order to achieve correct exposure of a region other than a high-luminance region in the imaging range. For example, the detection frame is set in a region other than an upper region corresponding to 20% of the imaging range. Light from a light source such as indoor lighting and outdoor sunlight typically falls down from above. Hence, by removal of an upper region of the imaging range from the detection frame, the HDR exposure control unit 104 can control exposure of HDR video on the basis of an HDR detection signal indicating the brightness of the region other than the high-luminance region.

Example of Algorithm Based on Histogram

In a case where the SDR exposure detection unit 41 and the HDR exposure detection unit 42 acquire luminance of each pixel, the SDR exposure control unit 103 and the HDR exposure control unit 104 can control exposure of SDR video and exposure of HDR video on the basis of a histogram with luminance on the horizontal axis. The histogram is a detection value formed of a set of luminance of each pixel.

Figure 21:
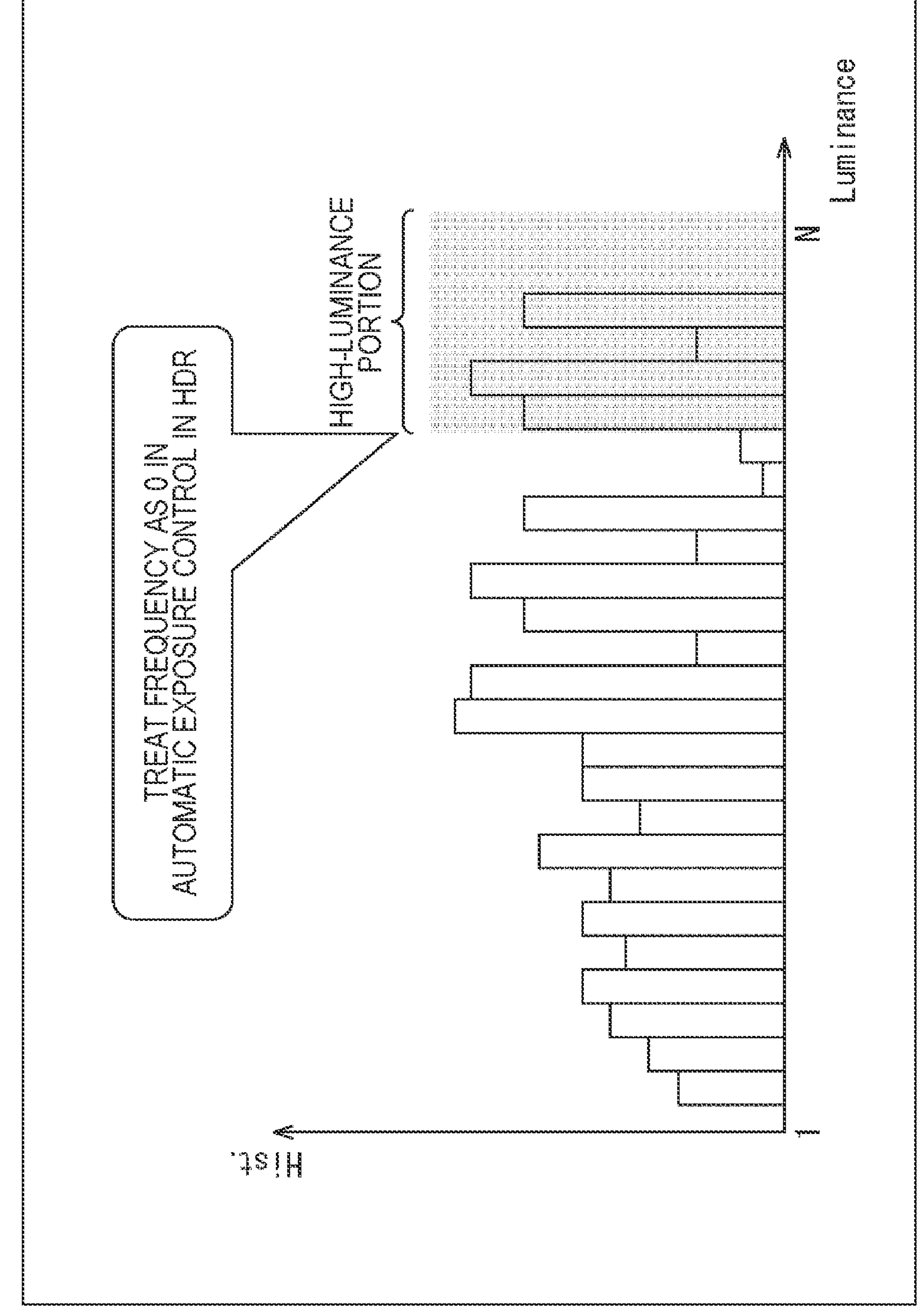
FIG. 21 is a view illustrating an example of a histogram.

FIG. 21 is a view illustrating an example of the histogram. In FIG. 21, the horizontal axis represents luminance (Luminance (t)), and the vertical axis represents a frequency (Hist).

The SDR exposure control unit 103 controls exposure of SDR video on the basis of all data of the histogram. As illustrated in a balloon of FIG. 21, for example, the HDR exposure control unit 104 treats a frequency of data of high luminance (luminance higher than a threshold) as 0, thereby controlling exposure of HDR video on the basis of data from which the data of high luminance is removed. Likewise, the exposure of the SDR video is controlled on the basis of the data from which the data of high luminance is removed.

The HDR exposure control unit 104 can also control exposure of HDR video on the basis of data in which data of each luminance is offset so that the frequency of Luminance (1) that is the minimum value of Luminance (t) becomes 0 in the histogram. For example, data of each luminance is offset by exposure adjustment performed by the exposure adjusting member. This can prevent occurrence of blocked-up shadows in the HDR video. The HDR exposure control unit 104, which removes the high-luminance data, can prevent occurrence of blocked-up shadows without depending on a subject. Also in exposure adjustment of SDR video, for any subject that has a histogram biased to the left, it is possible to similarly prevent occurrence of blocked-up shadows. In terms of not depending on a subject, it is easier to control exposure of HDR video.

The HDR exposure control unit 104 can also control exposure of HDR video on the basis of data in which data of each luminance is offset so that the frequency of Luminance (N) that is the maximum value of Luminance (t) becomes 0 in the histogram. This can prevent occurrence of blown-out highlights in the HDR video. Also in exposure adjustment of SDR video, it is possible to similarly prevent occurrence of blown-out highlights. In HDR, blown-out highlights are less likely to occur because of a wider range of HDR. Furthermore, HDR is more applicable to various subjects.

The HDR exposure control unit 104 can also control exposure of HDR video such that the integrated value of the histogram data becomes equal to a predetermined target value described by the following Expression (1). For example, a value at which correct exposure of the HDR video is achieved is set in advance as a target value.

[Expression 1]

$$\sum_{t=1}^{N}(\text{Luminance}(t)*Hist*Ct) \tag{1}$$

In Expression (1), Ct represents a weighting factor for Luminance (t). Here, a value corresponding to luminance is set as the weighting factor Ct. For example, as the weighting factor Ct for t that is equal to or greater than a certain value, a small value or a value of 0 is set. By setting a small value as the weighting factor Ct for high luminance, it is possible to reduce the contribution ratio of the high-luminance data to the integrated value of the histogram data. That is, exposure control of the HDR video based on data from which the high-luminance data is removed can be achieved by using the weighting factor Ct. Likewise, exposure of the SDR video is controlled by using the weighting factor Ct.

Example of Algorithm in which Plural Detection Frames are Set

In a case where the HDR exposure detection unit 42 sets a plurality of detection frames and detects the luminance of each pixel in a detection region defined by each detection frame, the HDR exposure control unit 104 controls exposure of HDR video on the basis of the detection value of each detection region.

Figure 22:
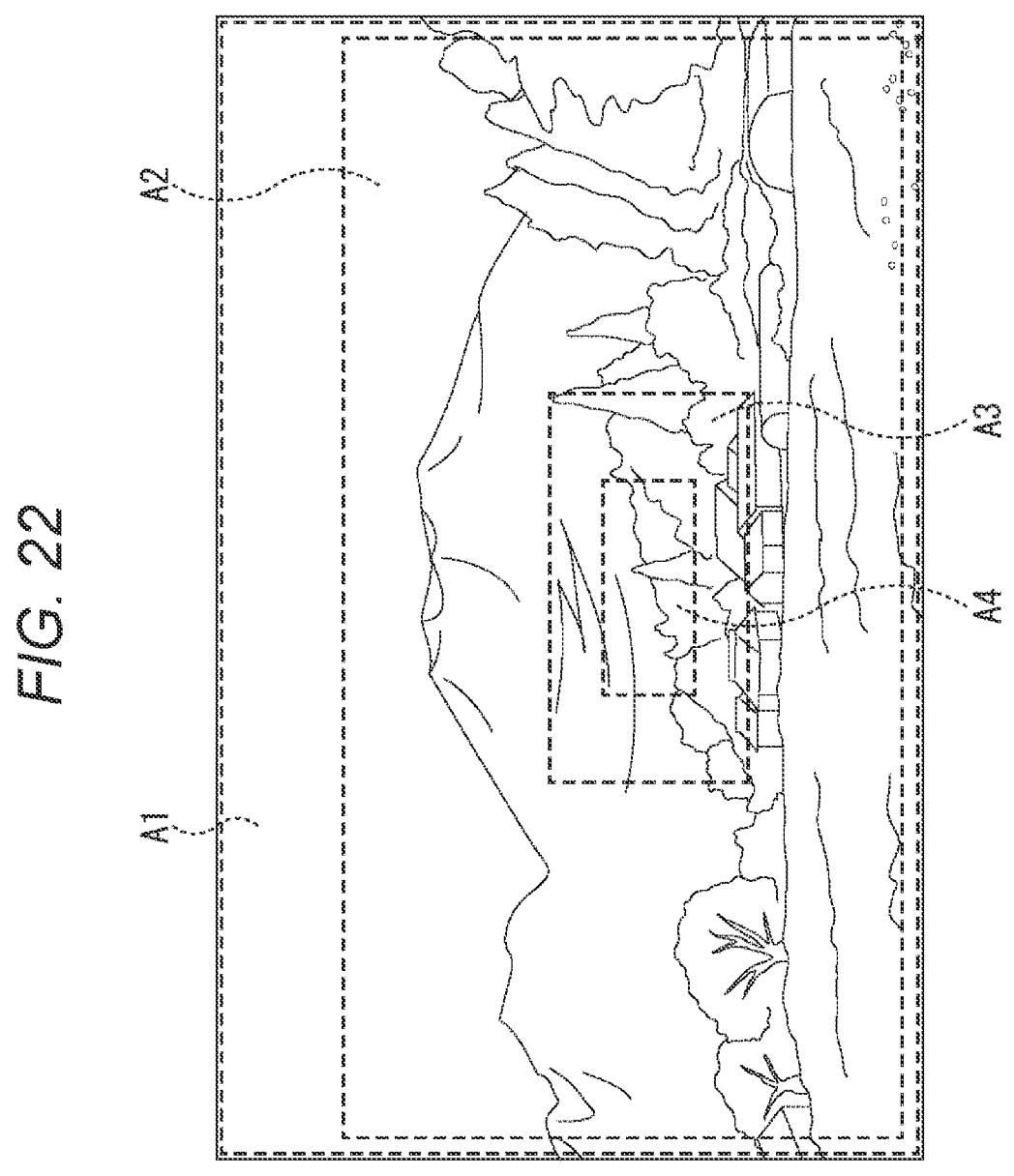

FIG. 22 is a view illustrating an example of a plurality of detection frames set by the HDR exposure detection unit 42.

As illustrated in FIG. 22, the HDR exposure detection unit 42 sets, for example, detection frames in four regions A1 to A4 in the imaging range. The region A4 is a rectangular region at the center of the imaging range, and the region A3 is a region surrounding the region A4. The region A2 is a region surrounding the region A3, and the region A1 is a region surrounding the region A2. Each of the regions A1 to A4 may be set as a region including another region, or may be set as a region from which another region is removed.

The HDR exposure control unit 104 calculates integrated values of luminance Luminance (x, y) of each pixel in each of the regions A1 to A4, described by the following Expression (2), as detection values L1 to L4 of the regions A1 to A4.

[Expression 2]

$$\sum_{x=1}^{m}\sum_{y=1}^{n} L(x, y) \tag{2}$$

The HDR exposure control unit 104 controls exposure of HDR video such that a value of L1*C1+L2*C2+L3*C3+L4*C4 becomes equal to a predetermined target value. Cn represents a weighting factor for a detection value of a region An, and C1 is set to a value lower than C2, C3, and C4.

By setting a weighting factor for the detection value of the region A1 that is likely to include a high-luminance region to a value lower than another weighting factor, it is possible to reduce the influence of the HDR detection signal indicating the brightness of the high-luminance region.

Note that, at that time, the SDR exposure detection unit 41 sets a detection frame over the entire region of the imaging range, for example, and calculates a detection value of the entire region of the imaging range.

Operation of Imaging Device

Figure 23:
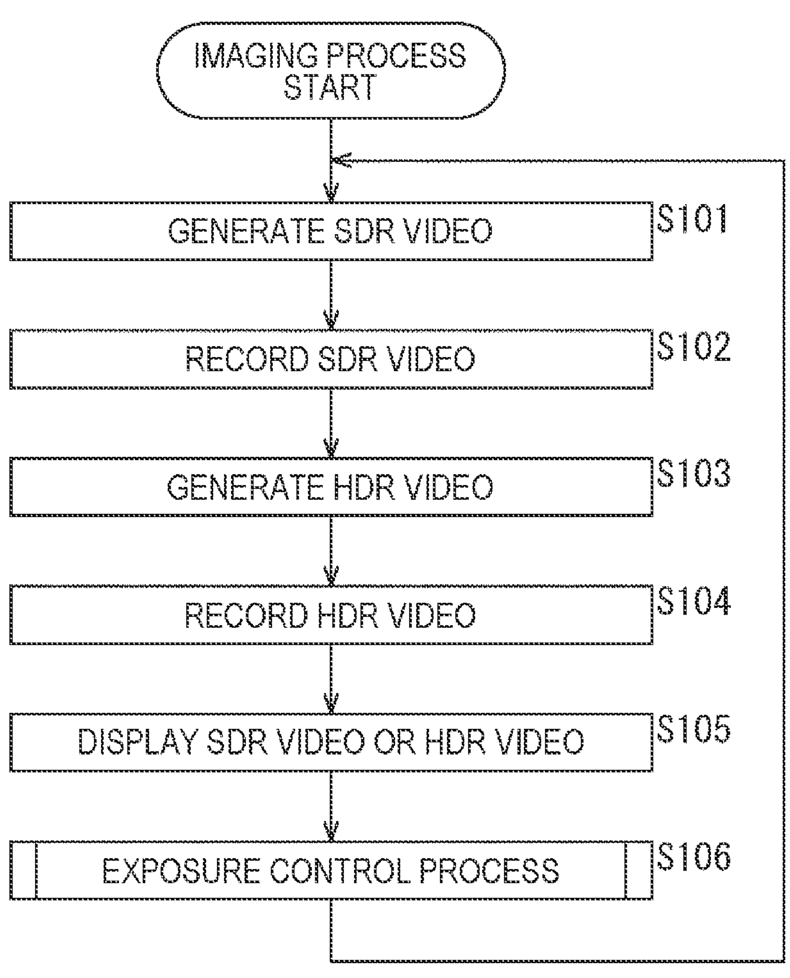
FIG. 23 is a flowchart illustrating an imaging process of the imaging device.

The imaging process of the imaging device having the above-described configuration will be described with reference to a flowchart of FIG. 23. For example, the imaging process in FIG. 23 is started while the imaging element 3 is outputting a video signal.

The processes of steps S101 to S105 are similar to the processes of the steps S1 to S5 in FIG. 9. Thus, SDR video and HDR video are generated, and the SDR video or the HDR video is displayed on the display unit 8.

In a step S106, the imaging device performs the exposure control process. By the exposure control process, exposure of the SDR video and exposure of the HDR video are controlled. Details of the exposure control process will be given later with reference to FIGS. 24 and 25.

After the exposure of the SDR video and the exposure of the HDR video are controlled, the process returns to the step S101, and the later processes are repeatedly performed.

Figure 24:
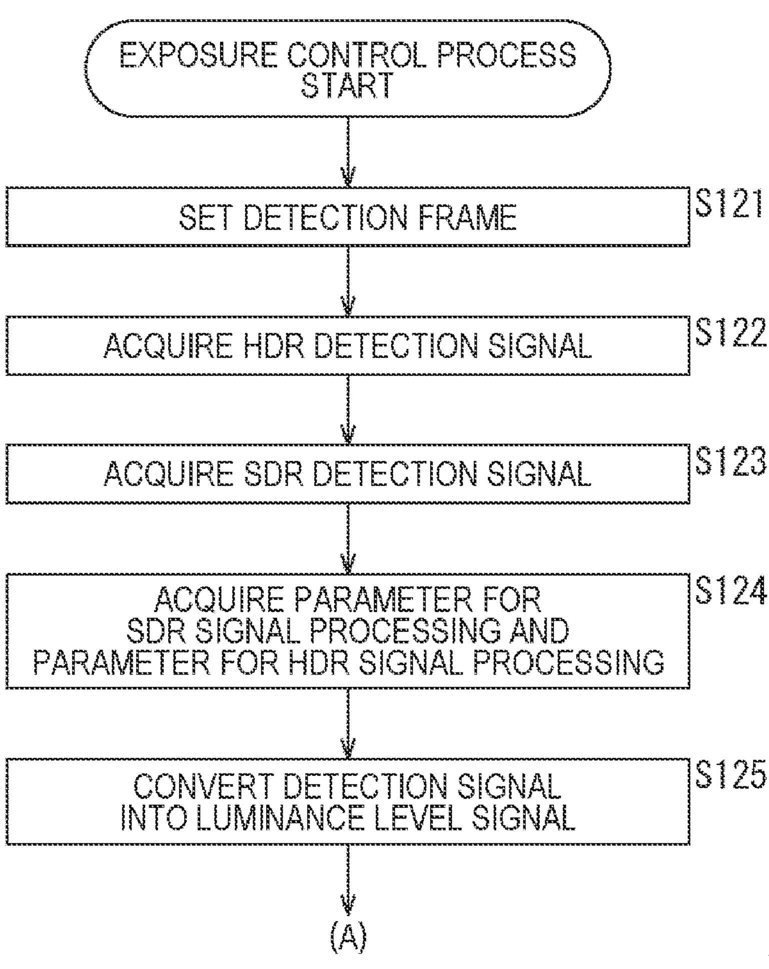
FIG. 24 is a flowchart illustrating an exposure control process performed in a step S106 in FIG. 23.

The exposure control process performed in the step S106 in FIG. 23 will be described with reference to flowcharts of FIGS. 24 and 25.

In a step S121, the SDR exposure detection unit 41 and the HDR exposure detection unit 42 set detection frames, respectively.

For example, the SDR exposure detection unit 41 can set a detection frame over the entire region of the imaging range, and the HDR exposure detection unit 42 can set a detection frame in a region other than an upper region of the imaging range. Furthermore, the SDR exposure detection unit 41 and the HDR exposure detection unit 42 each can set a plurality of detection frames. The detection frame may be set in a region having a shape other than a rectangle. In the following description, it is supposed that the SDR exposure detection unit 41 and the HDR exposure detection unit 42 set detection frames in a face region seen in the SDR video and the HDR video.

In a step S122, the HDR exposure detection unit 42 acquires an HDR detection signal indicating a detection value in the detection frame set in the step S121.

For example, the HDR exposure detection unit 42 acquires, as the detection value, a set of luminance of each pixel associated with coordinate data in the detection frame, an integrated value of luminance of each pixel in the detection frame, an integrated value of luminance of each pixel in each of small regions into which a region defined by the detection frame is divided, or the like. In the following description, it is supposed that the HDR exposure detection unit 42 acquires an HDR detection signal indicating a detection value obtained by division of an integrated value of luminance of each pixel associated with coordinate data in the detection frame by the number of pixels in the detection frame.

In a step S123, the SDR exposure detection unit 41 acquires an SDR detection signal indicating a detection value in the detection frame set in the step S121.

For example, the SDR exposure detection unit 41 acquires, as the detection value, a set of luminance of each pixel associated with coordinate data in the detection frame, an integrated value of luminance of each pixel in the detection frame, an integrated value of luminance of each pixel in each of small regions into which a region defined by the detection frame is divided, or the like. In the following description, it is supposed that the SDR exposure detection unit 41 acquires an SDR detection signal indicating a detection value obtained by division of an integrated value of luminance of each pixel associated with coordinate data in the detection frame by the number of pixels in the detection frame.

In a step S124, the SDR exposure detection unit 41 acquires a parameter used for SDR signal processing, and the HDR exposure detection unit 42 acquires a parameter used for HDR signal processing.

In a step S125, the SDR exposure detection unit 41 converts the SDR detection signal into a signal of a luminance level in IRE units on the basis of the parameter used for SDR signal processing. The HDR exposure detection unit 42 converts the HDR detection signal into a signal of a luminance level in IRE units on the basis of the parameter used for HDR signal processing.

In a step S126, the SDR exposure control unit 103 and the HDR exposure control unit 104 determine whether or not automatic control of exposure is disabled. The SDR exposure control unit 103 and the HDR exposure control unit 104 determine whether automatic control of exposure is enabled or disabled in response to the cameraman's operation, input of which has been received by the user operation unit 102.

In a case where it is determined in the step S126 that automatic control of exposure is enabled, the HDR exposure control unit 104 compares the detection value indicated by the HDR detection signal with a target value for HDR, and determines whether or not the detection value is smaller than the target value, in a step S127. As the target value for HDR, a detection value at which correct exposure of the HDR video is achieved is set in advance. The target value for HDR can be set by a designer of the imaging device or can be set by the cameraman. Furthermore, the target value for HDR may be acquired by learning in consideration of the preference of the cameraman.

In a case where it is determined in the step S127 that the detection value is smaller than the target value, the exposure of the region where a subject is seen in the HDR video is lower than correct exposure, and hence the HDR exposure control unit 104 controls the SDR/HDR exposure adjusting member in a step S128. Specifically, the HDR exposure control unit 104 obtains a difference amount Δ indicating a difference between the target value for HDR and the detection value, and controls a setting value of any of the SDR/HDR exposure adjusting members so that the detection value increases by the difference amount Δ.

On the other hand, in a case where it is determined in the step S127 that the detection value is equal to or greater than the target value, the HDR exposure control unit 104 determines whether or not the detection value indicated by the HDR detection signal is greater than the target value for HDR, in a step S129.

In a case where it is determined in the step S129 that the detection value is greater than the target value, the exposure of the region where the subject is seen in the HDR video is higher than correct exposure, and hence the HDR exposure control unit 104 controls the SDR/HDR exposure adjusting member in a step S130. Specifically, the HDR exposure control unit 104 obtains a difference amount Δ indicating a difference between the detection value and the target value for HDR, and controls a setting value of any of the SDR/HDR exposure adjusting members so that the detection value decreases by the difference amount Δ.

In a case where it is determined in the step S129 that the detection value is equal to or smaller than the target value, in other words, in a case where the detection value is equal to the target value, the process proceeds to a step S131 similarly to that after the process of the step S128 or the step S130. Note that, in this case, the HDR exposure control unit 104 calculates a value of the difference amount Δ indicating the difference between the target value for HDR and the detection value as 0.

In a step S131, the SDR exposure control unit 103 compares the detection value indicated by the SDR detection signal with a target value for SDR, and determines whether or not a sum of the detection value indicated by the SDR detection signal and the difference amount Δ used for control of the SDR/HDR exposure adjusting member is smaller than the target value.

Controlling the SDR/HDR exposure adjusting member in the step S128 or the step S130 causes a change in exposure of the SDR video. However, the change in the exposure of the SDR video is not reflected in the SDR detection signal. Therefore, in the step S131, by using the sum of the detection value indicated by the SDR detection signal and the difference amount Δ used for control of the SDR/HDR exposure adjusting member, it is possible to control the SDR exposure adjusting member in consideration of the change in the exposure of the SDR video, caused due to the adjustment of the SDR/HDR exposure adjusting member.

As the target value for SDR, like the target value for HDR, a value at which correct exposure of the SDR video is achieved is set in advance. The target value for SDR can be set by a designer of the imaging device or can be set by the cameraman. Furthermore, the target value for SDR may be acquired by learning in consideration of the preference of the cameraman.

In a case where it is determined in the step S131 that the sum of the detection value and the difference amount Δ is smaller than the target value, the exposure of the region where the subject is seen in the SDR video is lower than correct exposure, and hence the SDR exposure control unit 103 controls the SDR exposure adjusting member in a step S132. Specifically, the SDR exposure control unit 103 obtains a difference amount indicating a difference between the target value for SDR and the sum of the detection value and the difference amount 4, and controls a setting value of the SDR exposure adjusting member so that the detection value increases by the difference amount.

On the other hand, in a case where it is determined in the step S132 that the detection value is equal to or greater than the target value, the SDR exposure control unit 103 determines whether or not the sum of the detection value indicated by the SDR detection signal and the difference amount Δ is greater than the target value for SDR, in a step S133.

In a case where it is determined in the step S133 that the sum of the detection value and the difference amount Δ is greater than the target value, the exposure of the region where the subject is seen in the SDR video is higher than correct exposure, and hence the SDR exposure control unit 103 controls the SDR exposure adjusting member in a step S134. Specifically, the SDR exposure control unit 103 obtains a difference amount indicating a difference between the sum of the detection value and the difference amount 4, and the target value for HDR, and controls a setting value of the SDR exposure adjusting member so that the detection value decreases by the difference amount.

In a case where it is determined in the step S133 that the sum of the detection value and the difference amount Δ is equal to or smaller than the target value, in other words, in a case where the sum of the detection value and the difference amount Δ is equal to the target value, the process proceeds to a step S135 similarly to that after the process of the step S132 or the step S134.

In the step S135, the display unit 8 displays the detection frame defining the face region.

In a step S136, the SDR exposure-information calculation unit 32 generates SDR exposure information indicating the luminance level of the face region in the SDR video, on the basis of the SDR detection signal, and displays the SDR exposure information on the display unit 8. The HDR exposure-information calculation unit 33 generates HDR exposure information indicating the luminance level of the face region in the HDR video, on the basis of the HDR detection signal, and displays the HDR exposure information on the display unit 8.

Note that a result of adjustment of the SDR/HDR exposure adjusting member by the HDR exposure control unit 104 and a result of adjustment of the SDR exposure adjusting member by the SDR exposure control unit 103 may be displayed on the display unit 8 as the SDR exposure information or the HDR exposure information.

On the other hand, in a case where it is determined in the step S126 that automatic control of exposure is disabled, the display unit 8 displays the detection frame defining the face region in a step S137.

In a step S138, the SDR exposure-information calculation unit 32 generates SDR exposure information indicating the luminance level of the face region in the SDR video, on the basis of the SDR detection signal, and displays the SDR exposure information on the display unit 8. The HDR exposure-information calculation unit 33 generates HDR exposure information indicating the luminance level of the face region in the HDR video, on the basis of the HDR detection signal, and displays the HDR exposure information on the display unit 8.

After the process of the step S136 or the step S138 is performed, the process returns to the step S106 in FIG. 23, and the later processes are performed.

As described above, in the imaging device, exposure of the SDR video is controlled in accordance with the algorithm corresponding to the brightness of the SDR video, and exposure of the HDR video is controlled in accordance with the algorithm corresponding to the brightness of the HDR video. The imaging device can appropriately adjust exposure of each video in accordance with an algorithm suitable for each of exposure control of the SDR video and exposure control of the HDR video.

Modifications

Automatic Control of Exposure During Video Recording

In a case where the brightness of a region of a subject seen in SDR video changes during recording of the SDR video and HDR video, the SDR exposure control unit 103 can restrict change of a setting value of the SDR exposure adjusting member.

For example, in a case where the brightness of a region of a subject changes, the SDR exposure control unit 103 does not change a setting value of the SDR exposure adjusting member during recording of SDR video and HDR video. The SDR exposure control unit 103 may reduce the change sensitivity of a setting value of the SDR exposure adjusting member by setting a dead zone.

Also in a case where the cameraman operates the SDR/HDR exposure adjusting member during recording of SDR video and HDR video, the SDR exposure control unit 103 can restrict change of a setting value of the SDR exposure adjusting member.

There is a possibility that HDR video having frequently-changing brightness may be recorded, and hence it is not desirable to sensitively perform control of exposure of the SDR video and exposure of the HDR video. By restricting change of a setting value of the SDR exposure adjusting member during recording of the SDR video and the HDR video, it is possible to prevent control of exposure of the SDR video and exposure of the HDR video from being sensitively performed.

An exposure control process in a case where change of a setting value of the SDR exposure adjusting member is restricted during video recording will be described with reference to a flowchart of FIG. 26. Here, after the processes of the steps S121 to S125 in FIG. 24 are performed, the process proceeds to a step S151 in FIG. 26.

Figure 25:
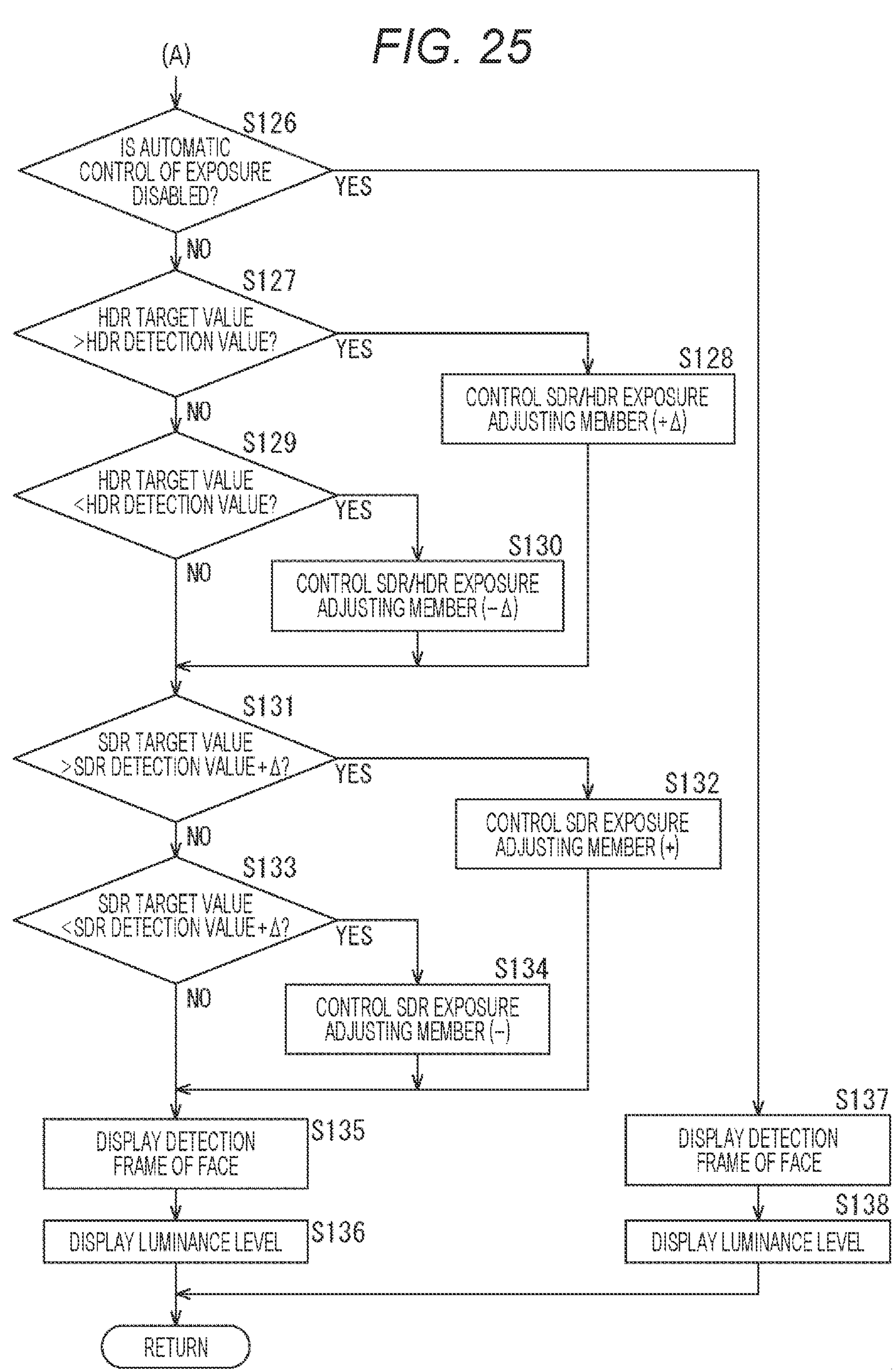
FIG. 25 is a flowchart illustrating the exposure control process performed in the step S106 in FIG. 23.

The processes of steps S151 to S155 are similar to the processes of the steps S126 to S130 in FIG. 25. By the processes of the steps S151 to S155, the SDR/HDR exposure adjusting members is controlled.

In a step S156, the SDR exposure control unit 103 determines whether or not SDR video and HDR video are being recorded.

In a case where it is determined in the step S156 that neither SDR video nor HDR video is being recorded, the process proceeds to a step S157.

Processes of the steps S157 to S160 are similar to the processes of the steps S131 to 134 in FIG. 25. By the processes of the steps S157 to S160, the SDR exposure adjusting member is controlled.

On the other hand, in a case where it is determined in the step S156 that SDR video and HDR video are being recorded, the processes of the steps S157 to S160 are skipped and the process proceeds to a step S161 similarly to that after the process of the step S158 or the step S160.

Processes of steps S161 to S164 are similar to the processes of the steps S135 to S138 in FIG. 25. By the processes of the steps S135 to S138, a detection frame and a luminance level are displayed on the display unit 8.

After the process of the step S162 or the step S164 is performed, the process returns to the step S106 in FIG. 23, and the later processes are performed.

Note that, in a case where the brightness of a region of a subject seen in the SDR video changes, or in a case where the cameraman operates the SDR/HDR exposure adjusting member, the HDR exposure control unit 104 can restrict change of a setting value of the SDR/HDR exposure adjusting member during recording of the SDR video and HDR video.

Figure 27:
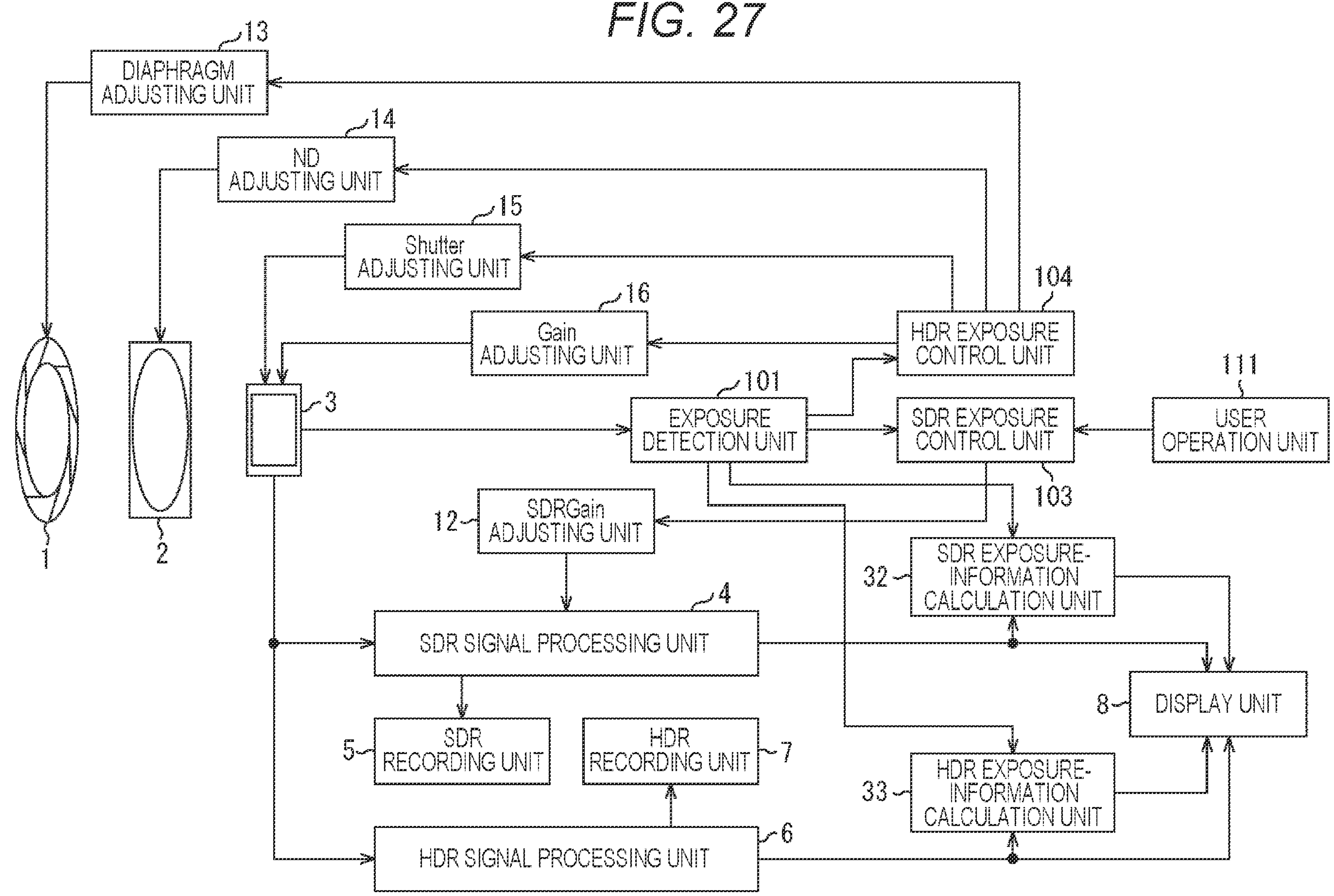
FIG. 27 is a block diagram illustrating another example of the third configuration of the imaging device.

Example in which Only Exposure Control by SDR Exposure Control Unit is Enabled or Disabled FIG. 27 is a block diagram illustrating another example of the third configuration of the imaging device. In FIG. 27, the same components as the components in FIG. 18 are denoted by the same reference signs. Redundant description will be omitted as appropriate.

The configuration of the imaging device illustrated in FIG. 27 is different from the configuration of the imaging device in FIG. 18 in that a user operation unit 111 is provided instead of the user operation unit 102.

The user operation unit 111 receives an input of an operation for enabling or disabling exposure control of SDR video by the SDR exposure control unit 103. The user operation unit 111 is configured as, for example, a momentary switch. Only while the momentary switch is being pressed, exposure control of SDR video by the SDR exposure control unit is enabled.

Note that each of the user operation unit 102 and the user operation unit 111 may be provided in the imaging device.

An exposure control process in a case where only exposure control by the SDR exposure control unit is enabled or disabled will be described with reference to a flowchart of FIG. 28. Here, after the processes of the steps S121 to S125 in FIG. 24 are performed, the process proceeds to a step S171 in FIG. 28.

Processes of the steps S171 to S174 are similar to the processes of the steps S127 to S130 in FIG. 25. By the processes of the steps S171 to S174, the SDR/HDR exposure adjusting member is controlled.

In a step S175, the SDR exposure control unit 103 determines whether or not automatic control of exposure of the SDR video is enabled. The SDR exposure control unit 103 determines whether automatic control of exposure is enabled or disabled, in response to the cameraman's operation, input of which has been received by the user operation unit 111.

In a case where it is determined in the step S175 that automatic control of exposure of the SDR video is enabled, the process proceeds to a step S176.

Processes of steps S176 to S179 are similar to the processes of steps S131 to 134 in FIG. 25. By the processes of the steps S176 to S179, the SDR exposure adjusting member is controlled.

On the other hand, in a case where it is determined in the step S175 that automatic control of exposure of the SDR video is disabled, the processes of the steps S176 to S179 are skipped and the process proceeds to a step S180 similarly to that after the process of the step S177 or the step S179.

Processes of steps S180 and S181 are similar to the processes of steps S135 and S136 in FIG. 25. By the processes of the steps S180 and S181, a detection frame and a luminance level are displayed on the display unit 8.

After the process of the step S181 is performed, the process returns to the step S106 in FIG. 23, and the later processes are performed.

Example in which HDR Exposure Adjusting Member is Provided

Figure 29:
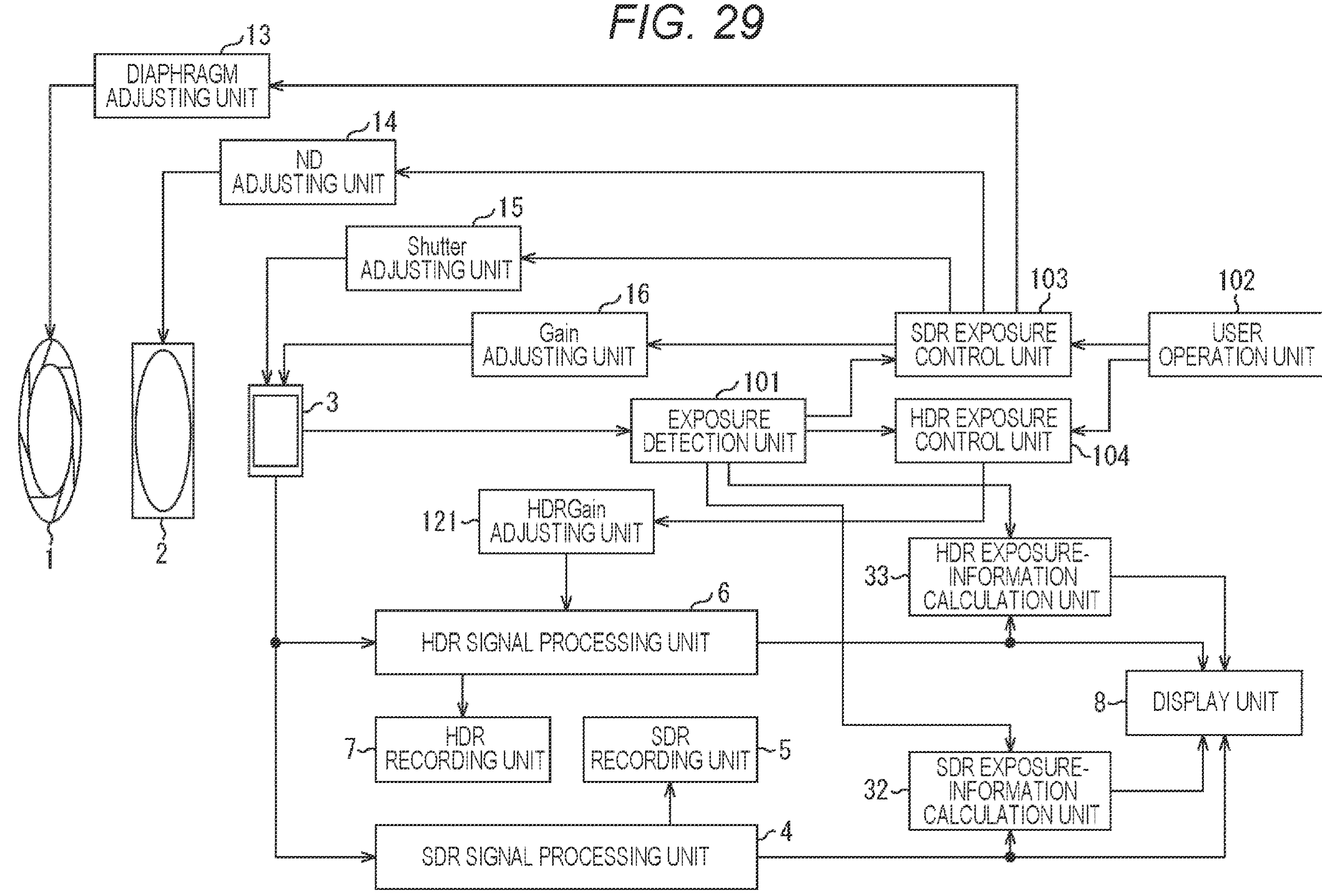
FIG. 29 is a block diagram illustrating another different example of the third configuration of the imaging device.

FIG. 29 is a block diagram illustrating another different example of the third configuration of the imaging device. In FIG. 29, the same components as the components in FIG. 18 are denoted by the same reference signs. Redundant description will be omitted as appropriate.

The configuration of the imaging device illustrated in FIG. 29 is different from the configuration of the imaging device in FIG. 18 in that the SDR gain adjusting unit 12 is not provided and an HDR gain adjusting unit 121 is provided.

The SDR exposure control unit 103 controls the SDR/HDR exposure adjusting member, to control exposure of SDR video.

The HDR exposure control unit 104 controls an HDR exposure adjusting member, to control exposure of HDR video. Specifically, the HDR exposure control unit 104 supplies a setting value of the HDR exposure adjusting member to the HDR gain adjusting unit 121.

The HDR gain adjusting unit 121 adjusts an HDR gain setting member under the control of the HDR exposure control unit 104. The HDR gain setting member is provided inside the HDR signal processing unit 6 as a member for setting an HDR gain that is an amplification factor of a video signal in HDR signal processing performed by the HDR signal processing unit 6. Only exposure of HDR video is adjusted by the HDR gain, and hence the HDR gain setting member not illustrated is also referred to as the HDR exposure adjusting member.

Example of Setting of Detection Frame

The SDR exposure detection unit 41 and the HDR exposure detection unit 42 detect, for example, the brightness of any of the entire imaging range of a video signal, a main subject, and the background.

In HDR video, blown-out highlights and blocked-up shadows are less likely to occur than in SDR video. It is considered that, by controlling exposure such that a region where a main subject is seen in HDR video is correctly exposed, it is possible to allow the luminance of the other regions to fall within the range of the HDR video. Therefore, by controlling exposure on the basis of the brightness of the main subject that has been detected by the SDR exposure detection unit 41 and the HDR exposure detection unit 42 and is regarded as a main subject by the cameraman, it is possible to appropriately control exposure of the HDR video.

The background indicates a region other than the region in which the main subject is seen in the imaging range. In a case where the luminance difference across the entire imaging range is large, blocked-up shadows or blown-out highlights may probably occur due to exposure adjustment for achieving correct exposure of the region where the main subject is seen. In this case, the HDR exposure control unit 104 controls the exposure such that the luminance of the entire imaging range falls within the range of the HDR video on the basis of the brightness of the background.

5. Fourth Embodiment

Figure 30:
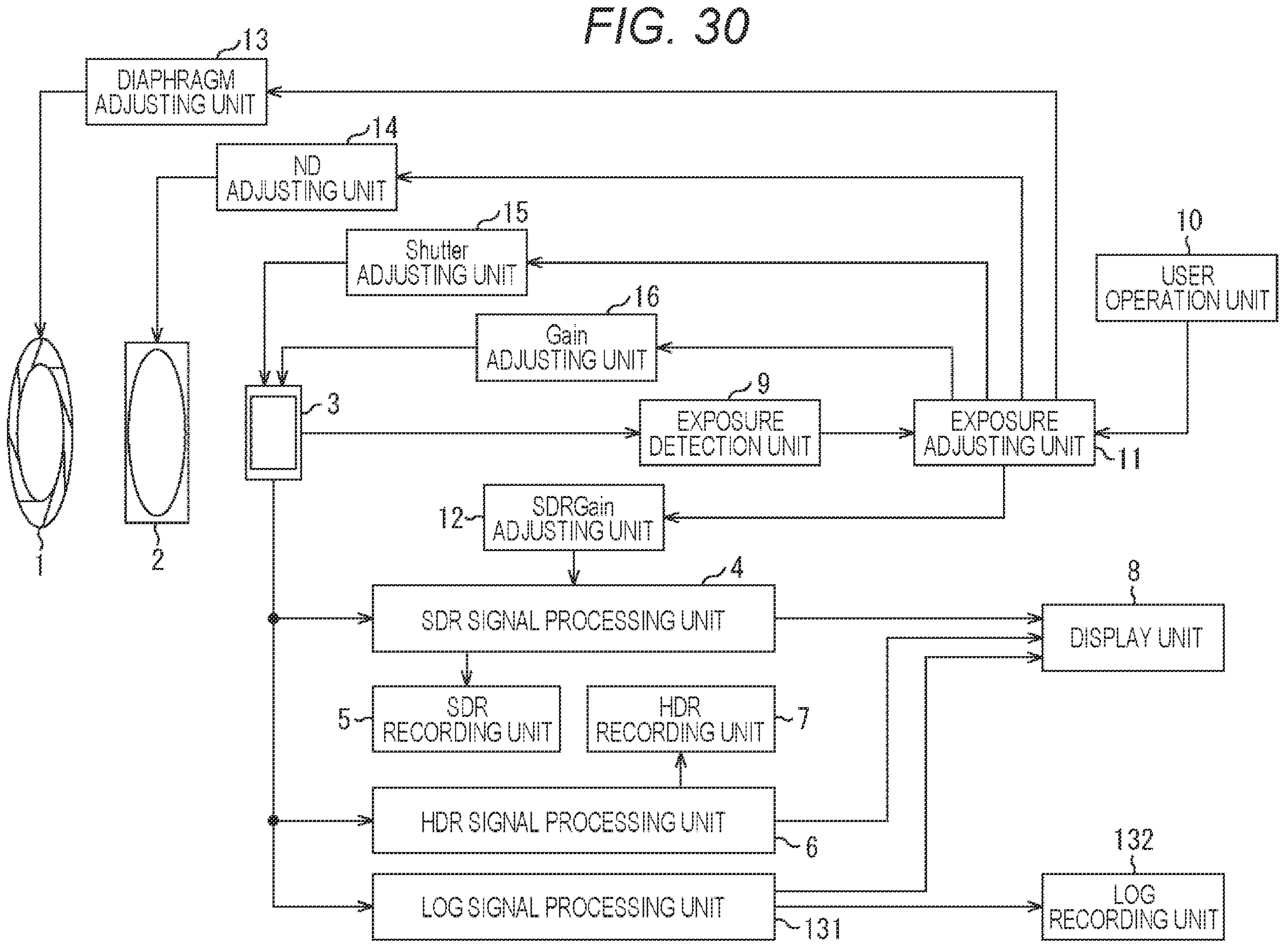
FIG. 30 is a block diagram illustrating an example of a configuration of the imaging device that generates third video together with SDR video and HDR video.

FIG. 30 is a block diagram illustrating an example of a configuration of the imaging device that generates third video together with SDR video and HDR video. In FIG. 30, the same components as the components in FIG. 1 are denoted by the same reference signs. Redundant description will be omitted as appropriate.

The configuration of the imaging device illustrated in FIG. 30 is different from the configuration of the imaging device in FIG. 1 in that a LOG signal processing unit 131 and a LOG recording unit 132 are provided.

The LOG signal processing unit 131 is supplied with the same video signal as a video signal supplied to the SDR signal processing unit 4 and the HDR signal processing unit 6, from the imaging element 3.

The LOG signal processing unit 131 performs processing such as gamma processing, knee processing, detail processing, color matrix processing, and LUT processing on the video signal supplied from the imaging element 3, to generate LOG video. The LOG video is video in a format having higher gradation than SDR video and HDR video. The LOG video generated by the LOG signal processing unit 131 is supplied to the LOG recording unit 132 and the display unit 8.

Note that the LOG video generated by the LOG signal processing unit 131 may be used for generation of SDR video in the SDR signal processing unit 4 and generation of HDR video in the HDR signal processing unit 6.

The LOG recording unit 132 includes, for example, a portable medium such as a large-capacity RAM, an SSD, an HDD, or an SD card provided in the imaging device. On the LOG recording unit 132, the LOG video supplied from the LOG signal processing unit 131 is recorded. The SDR recording unit 5, the HDR recording unit 7, and the LOG recording unit 132 may be formed of one recording medium.

The display unit 8 displays any of SDR video, HDR video, and LOG video. Note that LOG video is low-contrast video, and hence LOG video having been subjected to pseudo inverse gamma processing may be displayed on the display unit 8.

The above-described configuration for generating and recording the third video such as LOG video different from SDR video and HDR video in at least one of the color gamut, the gradation, the dynamic range, or the resolution is provided in the imaging devices according to the first embodiment, the second embodiment, and the third embodiment of the present technology. In the imaging devices according to those embodiments, the display unit 8 displays the SDR exposure information and the HDR exposure information while superimposing the information on the LOG video, for example.

The cameraman adjusts the SDR/HDR exposure adjusting member while viewing LOG video, to adjust exposure of SDR video, HDR video, and the LOG video. Furthermore, the cameraman adjusts the SDR exposure adjusting member while viewing SDR exposure information, to adjust exposure of SDR video. Moreover, the cameraman adjusts the HDR exposure adjusting member while viewing HDR exposure information, to adjust exposure of HDR video.

Note that, as the third video, RAW video, S-Log3 video, HDR video of hybrid log gamma (HLG) method, perceptual quantization (PQ) method, or the like may be generated and recorded. Furthermore, four or more types of video including SDR video and HDR video may be generated and recorded.

Others

Note that, the effects described in the present specification are mere examples and are not limiting, and other effects may be produced.

The embodiments of the present technology are not limited to the above-described embodiments, and various modifications may be made without departing from the spirit of the present technology.

Each step described in the above-described flowcharts can be performed by one device or can be shared by a plurality of devices.

In a case where one step includes a plurality of processes, the plurality of processes included in the one step can be performed by one device, or can be shared by a plurality of devices.

<Example of Combination of Configurations>

The present technology can have the following configurations.

(1)

An imaging device including:

an SDR signal processing unit configured to generate SDR video on a basis of a video signal output from an imaging element;

an HDR signal processing unit configured to generate HDR video on a basis of the video signal;

an SDR/HDR exposure adjusting member configured to adjust each of exposure of the SDR video and exposure of the HDR video;

an SDR exposure adjusting unit configured to adjust only the exposure of the SDR video;

an SDR recording unit on which the SDR video is recorded;

an HDR recording unit on which the HDR video is recorded; and a display unit configured to display SDR exposure information about the SDR video and HDR exposure information about the HDR video together with the SDR video or the HDR video.

(2)

The imaging device according to (1), in which the display unit displays a first warning as the SDR exposure information in a case where brightness of a subject seen in the SDR video is equal to or greater than a first upper limit threshold or in a case where the brightness of the subject seen in the SDR video is equal to or smaller than a first lower limit threshold, the display unit displays a second warning as the HDR exposure information in a case where brightness of the subject seen in the HDR video is equal to or greater than a second upper limit threshold, or in a case where the brightness of the subject seen in the HDR video is equal to or smaller than a second lower limit threshold, the second upper limit threshold is a value equal to or greater than the first upper limit threshold, and the second lower limit threshold is a value equal to or smaller than the first lower limit threshold.

(3)

The imaging device according to (1), in which the display unit displays a waveform or a histogram as the SDR exposure information and the HDR exposure information.

(4)

The imaging device according to (1), in which the display unit displays, as the SDR exposure information, a first mask indicating a region having brightness that is equal to or greater than a threshold in the SDR video, and displays, as the HDR exposure information, a second mask indicating a region having brightness that is equal to or greater than a threshold in the HDR video.

(5)

The imaging device according to (1) further including a face detection unit configured to detect a face or a partial region of the face from the SDR video or the HDR video, in which the display unit displays a luminance level of the region detected by the face detection unit in the SDR video, as the SDR exposure information, and displays a luminance level of the region detected by the face detection unit in the HDR video, as the HDR exposure information.

(6)

The imaging device according to any of (1) to (5), in which the display unit displays the SDR exposure information based on brightness of any of an entire imaging range of the video signal, a region designated by a user, and a region where a main subject is seen, in the SDR video, and the display unit displays the HDR exposure information based on brightness of any of the entire imaging range of the video signal, a region designated by the user, and a region where the main subject is seen, in the HDR video.

(7)

The imaging device according to (1), in which the display unit displays, as the SDR exposure information, a false color image of the SDR video while superimposing the false color image on the SDR video or the HDR video in one of regions into which a display region of the SDR video or the HDR video is divided with a main subject as a reference, and displays, as the HDR exposure information, a false color image of the HDR video while superimposing the false color image on the SDR video or the HDR video in another region.

(8)

The imaging device according to any of (1) to (7), further including:

a third signal processing unit configured to generate third video that is different from the SDR video and the HDR video in at least one of color gamut, gradation, a dynamic range, or resolution, on a basis of the video signal; and a third recording unit on which the third video is recorded.

(9)

An imaging method including:

generating SDR video on a basis of a video signal output from an imaging element;

generating HDR video on a basis of the video signal;

adjusting each of exposure of the SDR video and exposure of the HDR video;

adjusting only the exposure of the SDR video;

recording the SDR video;

recording the HDR video; and displaying SDR exposure information about the SDR video and HDR exposure information about the HDR video together with the SDR video and the HDR video.

(10)

An imaging device including:

an SDR signal processing unit configured to generate SDR video on a basis of a video signal output from an imaging element;

an HDR signal processing unit configured to generate HDR video on a basis of the video signal;

an SDR detection unit configured to acquire an SDR detection signal indicating brightness of an imaging range of the SDR video;

an HDR detection unit configured to acquire an HDR detection signal indicating brightness of an imaging range of the HDR video;

an SDR exposure control unit configured to control exposure of the SDR video on a basis of the SDR detection signal;

an HDR exposure control unit configured to control exposure of the HDR video on a basis of the HDR detection signal;

an SDR recording unit on which the SDR video is recorded; and an HDR recording unit on which the HDR video is recorded, in which the SDR detection unit and the SDR exposure control unit operate in accordance with a first algorithm, and the HDR detection unit and the HDR exposure control unit operate in accordance with a second algorithm different from the first algorithm.

(11)

The imaging device according to (10), in which the SDR detection unit acquires the SDR detection signal indicating brightness of a first region within an imaging range of the video signal, and the HDR detection unit acquires the HDR detection signal indicating brightness of a second region different from the first region in the imaging range.

(12)

The imaging device according to (10), in which the HDR detection unit acquires the HDR detection signal indicating luminance detected on a basis of the video signal, and the HDR exposure control unit controls the exposure of the HDR video on a basis of the HDR detection signal from which a signal indicating luminance higher than a threshold is removed.

(13)

The imaging device according to (10), in which the HDR detection unit acquires the HDR detection signal indicating luminance detected on a basis of the video signal, and the HDR exposure control unit controls the exposure of the HDR video on a basis of the HDR detection signal to which a weighting factor corresponding to the luminance is given.

(14)

The imaging device according to any of (10) to (13), in which the SDR detection unit and the HDR detection unit acquire luminance or illuminance within an imaging range of the video signal, the SDR detection unit and the SDR exposure control unit operate in accordance with the first algorithm corresponding to the luminance or the illuminance within the imaging range of the video signal, and the HDR detection unit and the HDR exposure control unit operate in accordance with the second algorithm corresponding to the luminance or the illuminance within the imaging range of the video signal.

(15)

The imaging device according to (14), in which the SDR detection unit and the HDR detection unit acquire the luminance or the illuminance of any of the entire imaging range of the video signal, a main subject, and a background.

(16)

The imaging device according to any of (10) to (15), further including an operation unit configured to receive an input of an operation to enable or disable at least one of control of the exposure of the SDR video by the SDR exposure control unit or control of the exposure of the HDR video by the HDR exposure control unit.

(17)

The imaging device according to (16), in which the operation unit is configured as a momentary switch, and the control of the exposure of the SDR video by the SDR exposure control unit is enabled only while the momentary switch is pressed.

(18)

The imaging device according to any of (10) to (17), further including:

an SDR/HDR exposure adjusting member used to simultaneously adjust the exposure of the SDR video and the exposure of the HDR video; and an SDR exposure adjusting member used to control the exposure of the SDR video, in which the SDR exposure control unit restricts change of a setting value of the SDR exposure adjusting member during recording of the SDR video and the HDR video in a case where brightness of a subject seen in the SDR video and the HDR video changes or in a case where the SDR/HDR exposure adjusting member is operated by a user.

(19)

The imaging device according to any of (10) to (18), further including:

a third signal processing unit configured to generate third video that is different from the SDR video and the HDR video in at least one of color gamut, gradation, a dynamic range, or resolution, on a basis of the video signal; and a third recording unit on which the third video is recorded.

(20)

An imaging method including:

generating SDR video on a basis of a video signal output from an imaging element;

generating HDR video on a basis of the video signal;

acquiring an SDR detection signal indicating brightness of an imaging range of the SDR video in accordance with a first algorithm;

acquiring an HDR detection signal indicating brightness of an imaging range of the HDR video in accordance with a second algorithm different from the first algorithm;

controlling exposure of the SDR video on a basis of the SDR detection signal in accordance with the first algorithm;

controlling exposure of the HDR video on a basis of the HDR detection signal in accordance with the second algorithm;

recording the SDR video; and recording the HDR video.

(21)

The imaging device according to (2), in which the display unit is capable of simultaneously displaying the first warning and the second warning in accordance with the brightness of the subject seen in the SDR video and the brightness of the subject seen in the HDR video.

(22)

The imaging device according to any of (10) to (17), further including:

an SDR/HDR exposure adjusting member used to simultaneously adjust the exposure of the SDR video and the exposure of the HDR video; and an HDR exposure adjusting member used to adjust the exposure of the HDR video, in which the SDR exposure control unit controls the SDR/HDR exposure adjusting member, to control the exposure of the SDR video, and the HDR exposure control unit controls the HDR exposure adjusting member, to control the exposure of the HDR video.

REFERENCE SIGNS LIST

1 Diaphragm
2 Neutral-density filter
3 Imaging element
4 SDR signal processing unit
5 SDR recording unit
6 HDR signal processing unit
7 HDR recording unit
8 Display unit
9 Exposure detection unit
10 User operation unit
11 Exposure adjusting unit
12 SDR gain adjusting unit
13 Diaphragm adjusting unit
14 ND adjusting unit
15 Shutter adjusting unit
16 Gain adjusting unit
31 Exposure detection unit
32 SDR exposure-information calculation unit
33 HDR exposure-information calculation unit
41 SDR exposure detection unit
42 HDR exposure detection unit
51, 52 Highlight warning
61 Waveform
71 Touch panel
72 Detection-region designation unit
73 Exposure detection unit
81 Face detection unit
101 Exposure detection unit
102 User operation unit
103 SDR exposure control unit
104 HDR exposure control unit
111 User operation unit
121 HDR gain adjusting unit
131 LOG signal processing unit
132 LOG recording unit

The invention claimed is:

1. An imaging device comprising:

circuitry configured to generate SDR video based on a video signal output from an imaging element, generate HDR video based on the video signal, simultaneously adjust each of exposure of the SDR video and exposure of the HDR video, and adjust only the exposure of the SDR video separately from the simultaneous adjustment;

at least one non-transitory computer-readable storage medium on which the SDR video is recorded and the HDR video is recorded; and a display configured to display SDR exposure information about the SDR video and HDR exposure information about the HDR video together with at least one of the SDR video or the HDR video.

2. The imaging device according to claim 1, wherein the display displays a first warning as the SDR exposure information in a case where brightness of a subject seen in the SDR video is equal to or greater than a first upper limit threshold or in a case where the brightness of the subject seen in the SDR video is equal to or smaller than a first lower limit threshold, wherein the display displays a second warning as the HDR exposure information in a case where brightness of the subject seen in the HDR video is equal to or greater than a second upper limit threshold, or in a case where the brightness of the subject seen in the HDR video is equal to or smaller than a second lower limit threshold, wherein the second upper limit threshold is a value equal to or greater than the first upper limit threshold, and wherein the second lower limit threshold is a value equal to or smaller than the first lower limit threshold.

3. The imaging device according to claim 1, wherein the display displays at least one of a waveform or a histogram as the SDR exposure information and the HDR exposure information.

4. The imaging device according to claim 1, wherein the display displays, as the SDR exposure information, a first mask indicating a region having brightness that is equal to or greater than a threshold in the SDR video, and wherein the display displays, as the HDR exposure information, a second mask indicating a region having brightness that is equal to or greater than a threshold in the HDR video.

5. The imaging device according to claim 1, wherein the circuitry is further configured to detect a face or a partial region of the face from the SDR video or the HDR video, wherein the display displays a luminance level of the detected face or the detected partial face region detected in the SDR video, as the SDR exposure information, and wherein the display displays a luminance level of the detected face or the detected partial face region detected in the HDR video, as the HDR exposure information.

6. The imaging device according to claim 1, wherein the display displays the SDR exposure information based on brightness of at least one of an entire imaging range of the video signal, a region designated by a user, or a region where a main subject is seen, in the SDR video, and wherein the display displays the HDR exposure information based on brightness of at least one of the entire imaging range of the video signal, a region designated by the user, or a region where the main subject is seen, in the HDR video.

7. The imaging device according to claim 1, wherein the display displays, as the SDR exposure information, a false color image of the SDR video while superimposing the false color image on the SDR video or the HDR video in one of regions into which a display region of the SDR video or the HDR video is divided with a main subject as a reference, and wherein the display displays, as the HDR exposure information, a false color image of the HDR video while superimposing the false color image on the SDR video or the HDR video in another region.

8. The imaging device according to claim 1, wherein the circuitry is further configured to generate third video that is different from the SDR video and the HDR video in at least one of color gamut, gradation, a dynamic range, or resolution, based on the video signal and wherein the imaging device further comprises a third non-transitory computer-readable storage medium on which the third video is recorded.

9. An imaging method comprising:

generating SDR video based on a video signal output from an imaging element;

generating HDR video based on the video signal;

simultaneously adjusting each of exposure of the SDR video and exposure of the HDR video;

adjusting only the exposure of the SDR video separately from the simultaneous adjustment;

recording the SDR video on at least one non-transitory computer-readable storage medium;

recording the HDR video on the at least one non-transitory computer-readable storage medium; and displaying SDR exposure information about the SDR video and HDR exposure information about the HDR video together with at least one of the SDR video or the HDR video.

10. An imaging device comprising:

circuitry configured to generate SDR video based on a video signal output from an imaging element, generate HDR video based on the video signal, acquire an SDR detection signal indicating brightness of an imaging range of the SDR video, acquire an HDR detection signal indicating brightness of an imaging range of the HDR video, control exposure of the SDR video based on the SDR detection signal, and control exposure of the HDR video based on the HDR detection signal; and at least one non-transitory computer-readable storage medium on which the SDR video is recorded and the HDR video is recorded, wherein operations of the circuitry to acquire the SDR detection signal and control the exposure of the SDR video are performed in accordance with a first algorithm, wherein operations of the circuitry to acquire the HDR detection signal and control the exposure of the HDR video are performed in accordance with a second algorithm different from the first algorithm, and wherein the circuitry is further configured to simultaneously adjust the exposure of the SDR video and the exposure of the HDR video, and control the exposure of the SDR video separately from the simultaneous adjustment.

11. The imaging device according to claim 10, wherein the circuitry acquires the SDR detection signal indicating brightness of a first region within an imaging range of the video signal, and wherein the circuitry acquires the HDR detection signal indicating brightness of a second region different from the first region in the imaging range.

12. The imaging device according to claim 10, wherein the circuitry acquires the HDR detection signal indicating luminance detected based on the video signal, and wherein the circuitry unit controls the exposure of the HDR video based on the HDR detection signal from which a signal indicating luminance higher than a threshold is removed.

13. The imaging device according to claim 10, wherein the circuitry acquires the HDR detection signal indicating luminance detected based on the video signal, and wherein the circuitry controls the exposure of the HDR video based on the HDR detection signal to which a weighting factor corresponding to the luminance is given.

14. The imaging device according to claim 10, wherein the circuitry is further configured to acquire luminance or illuminance within an imaging range of the video signal, wherein the circuitry acquires the SDR detection signal and controls the exposure of the SDR video in accordance with the first algorithm corresponding to the luminance or the illuminance within the imaging range of the video signal, and wherein the circuitry acquires the HDR detection signal and controls the exposure of the HDR video in accordance with the second algorithm corresponding to the luminance or the illuminance within the imaging range of the video signal.

15. The imaging device according to claim 14, wherein the circuitry acquires the luminance or the illuminance of at least one of the entire imaging range of the video signal, a main subject, or a background.

16. The imaging device according to claim 10, wherein the circuitry is further configured to receive an input of an operation to enable or disable at least one of the control of the exposure of the SDR video or the control of the exposure of the HDR video.

17. The imaging device according to claim 16, wherein the operation is input using a momentary switch, and wherein the control of the exposure of the SDR video is enabled only while the momentary switch is operated.

18. The imaging device according to claim 10, wherein the circuitry is further configured to restrict change of a setting value of the separate control of the exposure of the SDR video during recording of the SDR video and the HDR video in a case where brightness of a subject seen in the SDR video and the HDR video changes or in a case where an operation to simultaneously adjust the exposure of the SDR video and the exposure of the HDR video is performed.

19. The imaging device according to claim 10, wherein the circuitry is further configured to generate third video that is different from the SDR video and the HDR video in at least one of color gamut, gradation, a dynamic range, or resolution, based on the video signal, and wherein the imaging device further comprises a third recording unit on which the third video is recorded.

20. An imaging method comprising:

generating SDR video based on a video signal output from an imaging element;

generating HDR video based on the video signal;

acquiring an SDR detection signal indicating brightness of an imaging range of the SDR video in accordance with a first algorithm;

acquiring an HDR detection signal indicating brightness of an imaging range of the HDR video in accordance with a second algorithm different from the first algorithm;

controlling exposure of the SDR video based on the SDR detection signal in accordance with the first algorithm;

controlling exposure of the HDR video based on the HDR detection signal in accordance with the second algorithm;

recording the SDR video on at least one non-transitory computer-readable storage medium; and recording the HDR video on the at least one non-transitory computer-readable storage medium, wherein controlling the exposure of the SDR video and controlling the exposure of the HDR video includes simultaneously adjusting the exposure of the SDR video and the exposure of the HDR video, and wherein controlling the exposure of the SDR video includes controlling the exposure of the SDR video separately from the simultaneous adjustment.

* * * * *